(12) United States Patent
Isogawa et al.

(10) Patent No.: US 8,998,748 B2
(45) Date of Patent: Apr. 7, 2015

(54) GOLF BALL

(75) Inventors: Kazuhiko Isogawa, Kobe (JP); Yoshiko Matsuyama, Kobe (JP); Kosuke Tachibana, Kobe (JP)

(73) Assignee: Dunlop Sports Co. Ltd., Kobe (JP)

( * ) Notice: Subject to any disclaimer, the term of this patent is extended or adjusted under 35 U.S.C. 154(b) by 330 days.

(21) Appl. No.: 13/599,736

(22) Filed: Aug. 30, 2012

(65) Prior Publication Data

US 2013/0053180 A1 Feb. 28, 2013

(30) Foreign Application Priority Data

Aug. 31, 2011 (JP) .................. 2011-188120

(51) Int. Cl.
- A63B 37/04 (2006.01)
- A63B 37/00 (2006.01)
- C08G 18/48 (2006.01)
- C08L 9/00 (2006.01)

(52) U.S. Cl.
CPC ......... *A63B 37/0003* (2013.01); *A63B 37/0075* (2013.01); *A63B 37/0076* (2013.01); *A63B 37/008* (2013.01); *A63B 37/0087* (2013.01); *A63B 37/0092* (2013.01); *A63B 37/0031* (2013.01); *A63B 37/0033* (2013.01); *A63B 37/0043* (2013.01); *A63B 37/0045* (2013.01); *A63B 37/0062* (2013.01); *A63B 37/0064* (2013.01); *A63B 37/0065* (2013.01); *A63B 37/0096* (2013.01); *C08G 18/4854* (2013.01); *C08L 9/00* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 5,439,227 A * | 8/1995 | Egashira et al. | ............ | 473/373 |
| 5,553,852 A * | 9/1996 | Higuchi et al. | ............ | 473/373 |
| 6,129,640 A * | 10/2000 | Higuchi et al. | ............ | 473/374 |
| 6,135,898 A * | 10/2000 | Higuchi et al. | ............ | 473/374 |
| 6,210,294 B1 * | 4/2001 | Wu | ............ | 473/377 |
| 6,248,027 B1 * | 6/2001 | Hayashi et al. | ............ | 473/371 |
| 6,315,680 B1 * | 11/2001 | Dalton et al. | ............ | 473/373 |
| 6,468,169 B1 * | 10/2002 | Hayashi et al. | ............ | 473/371 |
| 6,551,202 B1 * | 4/2003 | Yoshida | ............ | 473/376 |
| 6,561,925 B2 * | 5/2003 | Watanabe et al. | ............ | 473/371 |
| 6,620,059 B2 * | 9/2003 | Sasaki et al. | ............ | 473/374 |
| 6,632,148 B2 * | 10/2003 | Hayashi et al. | ............ | 473/374 |
| 6,645,090 B2 * | 11/2003 | Ohama et al. | ............ | 473/371 |
| 6,659,888 B2 * | 12/2003 | Endo et al. | ............ | 473/371 |
| 6,663,507 B1 * | 12/2003 | Watanabe et al. | ............ | 473/373 |
| 6,986,718 B2 * | 1/2006 | Ohama et al. | ............ | 473/373 |
| 7,048,649 B1 * | 5/2006 | Watanabe et al. | ............ | 473/371 |
| 7,086,969 B2 * | 8/2006 | Higuchi et al. | ............ | 473/376 |
| 7,086,970 B2 * | 8/2006 | Hayashi et al. | ............ | 473/378 |
| 7,090,592 B2 * | 8/2006 | Watanabe et al. | ............ | 473/373 |
| 7,140,979 B2 * | 11/2006 | Umezawa et al. | ............ | 473/374 |

(Continued)

*Primary Examiner* — Alvin Hunter

(74) *Attorney, Agent, or Firm* — Birch, Stewart, Kolasch & Birch, LLP

(57) ABSTRACT

A golf ball 2 includes a core 4, a mid layer 6, a reinforcing layer 8, and a cover 10. A hardness Hm of the mid layer 6 is greater than a hardness Hc of the cover 10. A difference (Hm−Hc) is greater than 28. A hardness Hs2 at a surface of a sphere consisting of the core 4 and the mid layer 6 is greater than a hardness Hs3 at a surface of the golf ball 2. A difference (Hs2−Hs3) is less than 5. A thickness Tm of the mid layer 6 is larger than a thickness Tc of the cover 10. A ratio (Tm/Tc) is greater than 3.0 and less than 5.0. A diameter of the core 4 is equal to or greater than 38.2 mm. The hardness Hc of the cover 10 is equal to or less than 37.

11 Claims, 1 Drawing Sheet

(56) References Cited

U.S. PATENT DOCUMENTS

| | | | |
|---|---|---|---|
| 7,708,656 B2 * | 5/2010 | Sullivan et al. | 473/376 |
| 7,976,411 B2 * | 7/2011 | Sullivan et al. | 473/376 |
| 8,021,248 B2 * | 9/2011 | Sullivan et al. | 473/373 |
| 8,043,168 B2 * | 10/2011 | Isogawa et al. | 473/373 |
| 8,043,169 B2 * | 10/2011 | Sullivan et al. | 473/376 |
| 8,118,690 B2 * | 2/2012 | Kamino et al. | 473/374 |
| 2005/0181892 A1 | 8/2005 | Umezawa et al. | |
| 2006/0025238 A1 | 2/2006 | Endo et al. | |
| 2006/0252579 A1 | 11/2006 | Umezawa et al. | |

* cited by examiner

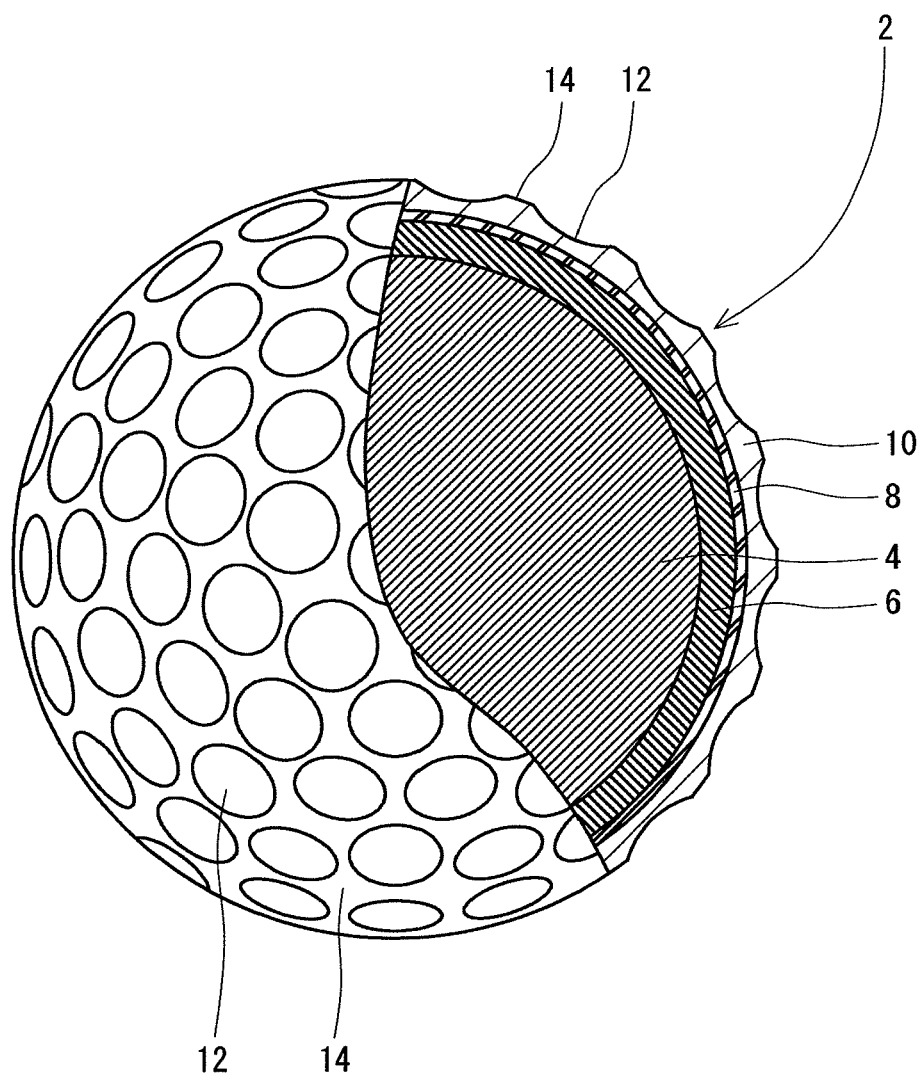

GOLF BALL

This application claims priority on Patent Application No. 2011-188120 filed in JAPAN on Aug. 31, 2011. The entire contents of this Japanese Patent Application are hereby incorporated by reference.

BACKGROUND OF THE INVENTION

1. Field of the Invention

The present invention relates to golf balls. Specifically, the present invention relates to golf balls that include a solid core, a mid layer, and a cover.

2. Description of the Related Art

Golf players' foremost requirement for golf balls is flight performance. In particular, golf players place importance on flight performance upon a shot with a driver. Flight performance correlates with the resilience performance of a golf ball. When a golf ball having excellent resilience performance is hit, the golf ball flies at a high speed, thereby achieving a large flight distance.

An appropriate trajectory height is required in order to achieve a large flight distance. A trajectory height depends on a spin rate and a launch angle. In a golf ball that achieves a high trajectory by a high spin rate, a flight distance is insufficient. In a golf ball that achieves a high trajectory by a high launch angle, a large flight distance is obtained. Use of an outer-hard/inner-soft structure in a golf ball can achieve a low spin rate and a high launch angle.

Golf players also place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball to which spin is easily provided has excellent controllability. In particular, advanced golf players place importance on controllability upon a shot with a short iron.

JP2005-224515 (US2005/0181892) discloses a golf ball that includes a core, a mid layer, and a cover. In the golf ball, the difference between the hardness of the mid layer and the hardness of the cover is small. The golf ball has excellent controllability upon a shot with a short iron.

JP2006-34740 (US2006/0025238) discloses a golf ball that includes a thin cover and a large core. In the golf ball, the large core can achieve high resilience performance.

JP2006-312044 (US2006/0252579) discloses a golf ball that includes a core, a mid layer, and a cover. In the golf ball, the difference between the hardness of the mid layer and the hardness of the cover is small. The golf ball has excellent controllability upon a shot with a short iron.

In the golf ball disclosed in JP2005-224515 (US2005/0181892), the spin rate upon a shot with a driver is high. The flight performance of the golf ball upon a shot with a driver is not sufficient. In the golf ball disclosed in JP2006-312044 (US2006/0252579) as well, the flight performance upon a shot with a driver is not sufficient.

When the golf ball disclosed in JP2006-34740 (US2006/0025238) is hit by a golf player whose head speed is low, it is unlikely to obtain a high launch angle. When the golf ball is hit by a powerless golf player with a driver, the flight performance is not sufficient.

An object of the present invention is to provide a golf ball that has excellent flight performance when being hit by a powerless golf player with a driver and has excellent controllability when being hit with a short iron.

SUMMARY OF THE INVENTION

A golf ball according to the present invention comprises a core, a mid layer positioned outside the core, and a cover positioned outside the mid layer. A Shore D hardness Hm of a material of the mid layer is greater than a Shore D hardness Hc of a material of the cover. A difference (Hm−Hc) between both hardnesses is greater than 28. A Shore D hardness Hs2 at a surface of a sphere consisting of the core and the mid layer is greater than a Shore D hardness Hs3 at a surface of the golf ball. A difference (Hs2−Hs3) between both hardnesses is less than 5. A thickness Tm of the mid layer is larger than a thickness Tc of the cover. A ratio (Tm/Tc) of both thicknesses is greater than 3.0 and less than 5.0. A diameter of the core is equal to or greater than 38.2 mm. The hardness Hc is equal to or less than 37.

Preferably, an amount of compressive deformation D1 of the core which is measured under conditions of an initial load of 98 N and a final load of 1274 N is equal to or greater than 3.6 mm. An amount of compressive deformation D3 of the golf ball which is measured under the same conditions is equal to or greater than 2.9 mm.

Preferably, the hardness Hs2 is equal to or greater than 50 but equal to or less than 70. Preferably, the hardness Hs3 is equal to or greater than 55 but equal to or less than 70.

The cover can be formed from a resin composition. Preferably, a principal component of a base material of the resin composition is a thermoplastic polyurethane. A polyol component of the thermoplastic polyurethane is polytetramethylene ether glycol having a number average molecular weight of 1500 or less.

The golf ball can further comprise a reinforcing layer positioned between the mid layer and the cover and formed from an adhesive. Preferably, a gel fraction of the adhesive is equal to or greater than 40% but equal to or less than 80%.

The core is composed of one or more layers. Any one of these layers can be obtained by a rubber composition being crosslinked. Preferably, the rubber composition includes:
 (a) a base rubber;
 (b) a co-crosslinking agent;
 (c) a crosslinking initiator; and
 (d) a carboxylic acid and/or a salt thereof.
The co-crosslinking agent (b) is:
 (b1) an α,β-unsaturated carboxylic acid having 3 to 8 carbon atoms; and/or
 (b2) a metal salt of an α,β-unsaturated carboxylic acid having 3 to 8 carbon atoms.

Preferably, the rubber composition includes 100 parts by weight of the base rubber (a) and 3 parts by weight or greater but 40 parts by weight or less of the carboxylic acid and/or the salt thereof (d).

Preferably, a carbon number of a carboxylic acid component of the carboxylic acid and/or the salt thereof (d) is equal to or greater than 4 but equal to or less than 30.

Preferably, the carboxylic acid and/or the salt thereof (d) is a fatty acid and/or a salt thereof.

Preferably, the carboxylic acid and/or the salt thereof (d) is a zinc salt of a carboxylic acid.

Preferably, the carboxylic acid and/or the salt thereof (d) is one or more members selected from the group consisting of zinc octoate, zinc laurate, zinc myristate, and zinc stearate.

When the golf ball according to the present invention is hit by a powerless golf player with a driver, the golf ball flies with a high launch angle. The golf ball has excellent flight performance when being hit by a powerless golf player with a driver. When the golf ball is hit with a short iron, the golf ball flies with a high spin rate. The golf ball has excellent controllability when being hit with a short iron.

BRIEF DESCRIPTION OF THE DRAWINGS

FIG. 1 is a partially cutaway cross-sectional view of a golf ball according to one embodiment of the present invention.

DESCRIPTION OF THE PREFERRED EMBODIMENTS

The following will describe in detail the present invention, based on preferred embodiments with reference to the accompanying drawings.

A golf ball 2 shown in FIG. 1 includes a spherical core 4, a mid layer 6 positioned outside the core 4, a reinforcing layer 8 positioned outside the mid layer 6, and a cover 10 positioned outside the reinforcing layer 8. On the surface of the cover 10, a large number of dimples 12 are formed. Of the surface of the golf ball 2, a part other than the dimples 12 is a land 14. The golf ball 2 includes a paint layer and a mark layer on the external side of the cover 10 although these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The core 4 is obtained by crosslinking a rubber composition. The rubber composition includes:
(a) a base rubber;
(b) a co-crosslinking agent; and
(c) a crosslinking initiator.
The rubber composition preferably further includes
(d) a carboxylic acid and/or a salt thereof.

Examples of the base rubber (a) include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred that the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% by weight and more preferably equal to or greater than 80% by weight.

A polybutadiene in which the proportion of 1,2-vinyl bonds is equal to or less than 2.0% by weight is preferred. The polybutadiene can contribute to the resilience performance of the core 4. In this respect, the proportion of 1,2-vinyl bonds is preferably equal to or less than 1.7% by weight and particularly preferably equal to or less than 1.5% by weight.

A preferable catalyst used for synthesizing a polybutadiene is a rare-earth-element-containing catalyst. A polybutadiene synthesized with the rare-earth-element-containing catalyst has a low proportion of 1,2-vinyl bonds. In particular, a polybutadiene synthesized with a catalyst containing neodymium, which is a lanthanum-series rare earth element compound, is preferred.

The polybutadiene has a Mooney viscosity ($ML_{1+4}(100°$ C.)) of preferably 30 or greater, more preferably 32 or greater, and particularly preferably 35 or greater. The Mooney viscosity ($ML_{1+4}(100°$ C.)) is preferably equal to or less than 140, more preferably equal to or less than 120, even more preferably equal to or less than 100, and particularly preferably equal to or less than 80. The Mooney viscosity ($ML_{1+4}(100°$ C.)) is measured according to the standards of "JIS K6300". The measurement conditions are as follows.
Rotor: L rotor
Preheating time: 1 minute
Rotating time of rotor: 4 minutes
Temperature: 100° C.

In light of workability, the polybutadiene has a molecular weight distribution (Mw/Mn) of preferably 2.0 or greater, more preferably 2.2 or greater, even more preferably 2.4 or greater, and particularly preferably 2.6 or greater. In light of resilience performance, the molecular weight distribution (Mw/Mn) is preferably equal to or less than 6.0, more preferably equal to or less than 5.0, even more preferably equal to or less than 4.0, and particularly preferably equal to or less than 3.4. The molecular weight distribution (Mw/Mn) is calculated by dividing the weight average molecular weight Mw by the number average molecular weight Mn.

The molecular weight distribution is measured by gel permeation chromatography ("HLC-8120GPC" manufactured by Tosoh Corporation). The measurement conditions are as follows.
Detector: differential refractometer
Column: GMHHXL (manufactured by Tosoh Corporation)
Column temperature: 40° C.
Mobile phase: tetrahydrofuran
The molecular weight distribution is calculated as a value obtained by conversion using polystyrene standard.

The co-crosslinking agent (b) is:
(b1) an $\alpha,\beta$-unsaturated carboxylic acid having 3 to 8 carbon atoms; and/or
(b2) a metal salt of an $\alpha,\beta$-unsaturated carboxylic acid having 3 to 8 carbon atoms.

The rubber composition may include only the $\alpha,\beta$-unsaturated carboxylic acid (b1) or only the metal salt (b2) of the $\alpha,\beta$-unsaturated carboxylic acid as the co-crosslinking agent (b). The rubber composition may include both the $\alpha,\beta$-unsaturated carboxylic acid (b1) and the metal salt (b2) of the $\alpha,\beta$-unsaturated carboxylic acid as the co-crosslinking agent (b).

The metal salt (b2) of the $\alpha,\beta$-unsaturated carboxylic acid graft-polymerizes with the molecular chain of the base rubber, thereby crosslinking the rubber molecules. When the rubber composition includes the $\alpha,\beta$-unsaturated carboxylic acid (b1), the rubber composition preferably further includes a metal compound (e). The metal compound (e) reacts with the $\alpha,\beta$-unsaturated carboxylic acid (b1) in the rubber composition. A salt obtained by this reaction graft-polymerizes with the molecular chain of the base rubber.

Examples of the metal compound (e) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. A compound that includes a bivalent metal is preferred. The compound that includes the bivalent metal reacts with the co-crosslinking agent (b) to form metal crosslinks. The metal compound (e) is particularly preferably a zinc compound. Two or more metal compounds may be used in combination.

Examples of the α,β-unsaturated carboxylic acids include acrylic acid, methacrylic acid, fumaric acid, maleic acid, and crotonic acid. Examples of the metal component in the metal salt (b2) of the α,β-unsaturated carboxylic acid include sodium ion, potassium ion, lithium ion, magnesium ion, calcium ion, zinc ion, barium ion, cadmium ion, aluminum ion, tin ion, and zirconium ion. The metal salt (b2) of the α,β-unsaturated carboxylic acid may include two or more types of ions. From the standpoint that metal crosslinks are likely to occur between the rubber molecules, bivalent metal ions such as magnesium ion, calcium ion, zinc ion, barium ion, and cadmium ion are preferred. The metal salt (b2) of the α,β-unsaturated carboxylic acid is particularly preferably zinc acrylate.

In light of resilience performance of the golf ball 2, the amount of the co-crosslinking agent (b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight and particularly preferably equal to or less than 40 parts by weight, per 100 parts by weight of the base rubber.

The crosslinking initiator (c) is preferably an organic peroxide. The organic peroxide contributes to the resilience performance of the golf ball 2. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the crosslinking initiator (c) is preferably equal to or greater than 0.2 parts by weight and particularly preferably equal to or greater than 0.5 parts by weight, per 100 parts by weight of the base rubber. In light of feel at impact and durability of the golf ball 2, the amount is preferably equal to or less than 5.0 parts by weight and particularly preferably equal to or less than 2.5 parts by weight, per 100 parts by weight of the base rubber.

In the present invention, the co-crosslinking agent (b) is not included in the concept of the carboxylic acid and/or the salt thereof (d). The carboxylic acid component of the carboxylic acid and/or the salt thereof (d) has a carboxyl group. The carboxylic acid component exchanges a cationic component with the co-crosslinking agent (b). During heating and forming of the core 4, the heat of a crosslinking reaction of the base rubber remains near the central point of the core 4. Thus, during heating and forming of the core 4, the temperature at the central portion is high. The temperature gradually decreases from the central point toward the surface. A cation exchange reaction between the carboxylic acid and/or the salt thereof (d) and the co-crosslinking agent (b) is likely to take place in the central portion of the core 4 where the temperature is high, and is unlikely to take place near the surface of the core 4. In other words, breaking of metal crosslinks is likely to occur in the central portion of the core 4 and is unlikely to occur near the surface of the core 4. As a result, the crosslinking density of the core 4 increases from its central point toward its surface. In the core 4, the hardness linearly increases from its central point toward its surface. When a powerless golf player hits the golf ball 2 with a driver, a high launch angle is obtained.

The carbon number of the carboxylic acid component of the carboxylic acid and/or the salt thereof (d) is preferably equal to or greater than 4 but equal to or less than 30, and is particularly preferably equal to or greater than 8 but equal to or less than 30. Examples of the carboxylic acid include aliphatic carboxylic acids (fatty acids) and aromatic carboxylic acids. Fatty acids and salts thereof are preferred.

The rubber composition may include a saturated fatty acid or a salt thereof, or may include an unsaturated fatty acid or a salt thereof. The saturated fatty acid and the salt thereof are preferred.

Examples of fatty acids include butyric acid (C4), valeric acid (C5), caproic acid (C6), enanthic acid (C7), caprylic acid (octanoic acid) (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination.

An aromatic carboxylic acid has an aromatic ring and a carboxyl group. Examples of aromatic carboxylic acids include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid), diphenic acid (biphenyl-2,2'-dicarboxylic acid), toluic acid (methylbenzoic acid), xylic acid, prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cuminic acid (4-isopropylbenzoic acid), uvitic acid (5-methylisophthalic acid), α-toluic acid (phenylacetic acid), hydratropic acid (2-phenylpropanoic acid), and hydrocinnamic acid (3-phenylpropanoic acid).

The rubber composition may include an aromatic carboxylic acid substituted with a hydroxyl group, an alkoxy group, or an oxo group, or a salt thereof. Examples of this carboxylic acid can include salicylic acid (2-hydroxybenzoic acid), anisic acid (methoxybenzoic acid), cresotinic acid (hydroxy(methyl)benzoic acid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoic acid), β-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratric acid (3,4-dimethoxybenzoic acid), o-veratric acid (2,3-dimethoxybenzoic acid), orsellinic acid (2,4-dihydroxy-6-methylbenzoic acid), m-hemipinic acid (4,5-dimethoxyphthalic acid), gallic acid (3,4,5-trihydroxybenzoic acid), syringic acid (4-hydroxy-3,5-dimethoxybenzoic acid), asaronic acid (2,4,5-trimethoxybenzoic acid), mandelic acid (hydroxy(phenyl)acetic acid), vanillylmandelic acid (hydroxy(4-hydroxy-3-methoxyphenyl)acetic acid), homoanisic acid ((4-methoxyphenyl)acetic acid), homogentisic acid ((2,5-dihydroxyphenyl)acetic acid), homoprotocatechuic acid ((3,4-dihydroxyphenyl)acetic acid), homovanillic acid ((4-hydroxy-3-methoxyphenyl)acetic acid), homoisovanillic acid ((3-hydroxy-4-methoxyphenyl)acetic acid), homoveratric acid ((3,4-dimethoxyphenyl) acetic acid), o-homoveratric acid ((2,3-dimethoxyphenyl) acetic acid), homophthalic acid (2-(carboxymethyl)benzoic acid), homoisophthalic acid (3-(carboxymethyl)benzoic acid), homoterephthalic acid (4-(carboxymethyl)benzoic acid), phthalonic acid (2-(carboxycarbonyl)benzoic acid), isophthalonic acid (3-(carboxycarbonyl)benzoic acid), terephthalonic acid (4-(carboxycarbonyl)benzoic acid), benzilic acid (hydroxydiphenylacetic acid), atrolactic acid (2-hydroxy-2-phenylpropanoic acid), tropic acid (3-hydroxy-2-phenylpropanoic acid), melilotic acid (3-(2-hydroxyphenyl) propanoic acid), phloretic acid (3-(4-hydroxyphenyl) propanoic acid), hydrocaffeic acid (3-(3,4-dihydroxyphenyl) propanoic acid), hydroferulic acid (3-(4-hydroxy-3-methoxyphenyl)propanoic acid), hydroisoferulic acid (3-(3-hydroxy-4-methoxyphenyl)propanoic acid), p-coumaric acid (3-(4-hydroxyphenyl)acrylic acid), umbellic acid (3-(2,4-dihydroxyphenyl)acrylic acid), caffeic acid (3-(3,4-dihydroxyphenyl)acrylic acid), ferulic acid (3-(4-hydroxy-3-methoxyphenyl)acrylic acid), isoferulic acid (3-(3-hydroxy-4-methoxyphenyl)acrylic acid), and sinapic acid (3-(4-hydroxy-3,5-dimethoxyphenyl)acrylic acid).

The cationic component of the carboxylate is a metal ion or an organic cation. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, and titanium ion. Two or more types of ions may be used in combination.

The organic cation is a cation having a carbon chain. Examples of the organic cation include organic ammonium ions. Examples of organic ammonium ions include primary ammonium ions such as stearylammonium ion, hexylammonium ion, octylammonium ion, and 2-ethylhexylammonium ion; secondary ammonium ions such as dodecyl(lauryl)ammonium ion, and octadecyl (stearyl)ammonium ion; tertiary ammonium ions such as trioctylammonium ion; and quaternary ammonium ions such as dioctyldimethylammonium ion, and distearyldimethylammoniumion. Two or more types of organic cations may be used in combination.

Examples of preferable carboxylates include a potassium salt, a magnesium salt, an aluminum salt, a zinc salt, an iron salt, a copper salt, a nickel salt, or a cobalt salt of octanoic acid, lauric acid, myristic acid, palmitic acid, stearic acid, oleic acid, or behenic acid. A zinc salt of a carboxylic acid is preferred.

In light of linearity of the hardness distribution of the core 4, the amount of the carboxylic acid and/or the salt thereof (d) is preferably equal to or greater than 3 parts by weight, more preferably equal to or greater than 10 parts by weight, and particularly preferably equal to or greater than 15 parts by weight, per 100 parts by weight of the base rubber. In light of resilience performance, the amount is preferably equal to or less than 40 parts by weight, more preferably equal to or less than 30 parts by weight, and particularly preferably equal to or less than 20 parts by weight, per 100 parts by weight of the base rubber.

As the co-crosslinking agent (b), zinc acrylate is preferably used. Zinc acrylate whose surface is coated with stearic acid or zinc stearate is present. The stearic acid and the zinc stearate enhance the dispersibility of zinc acrylate to rubber. When the rubber composition includes this zinc acrylate, the stearic acid and the zinc stearate serve as the carboxylic acid and/or the salt thereof (d). For example, when the rubber composition includes 25 parts by weight of zinc acrylate that includes 10% by weight of stearic acid, the amount of the stearic acid is regarded as 2.5 parts by weight, and the amount of the zinc acrylate is regarded as 22.5 parts by weight.

The rubber composition preferably further includes an organic sulfur compound (f). The organic sulfur compound (f) can contribute to control of: the linearity of the hardness distribution of the core 4; and the degree of the outer-hard/inner-soft structure. An example of the organic sulfur compound (f) is an organic compound having a thiol group or a polysulfide linkage having 2 to 4 sulfur atoms. A metal salt of this organic compound is also included in the concept of the organic sulfur compound (f). Examples of the organic sulfur compound (f) include aliphatic compounds such as aliphatic thiols, aliphatic thiocarboxylic acids, aliphatic dithiocarboxylic acids, and aliphatic polysulfides; heterocyclic compounds; alicyclic compounds such as alicyclic thiols, alicyclic thiocarboxylic acids, alicyclic dithiocarboxylic acids, and alicyclic polysulfides; and aromatic compounds. Specific examples of the organic sulfur compound (f) include thiophenols, thionaphthols, polysulfides, thiocarboxylic acids, dithiocarboxylic acids, sulfenamides, thiurams, dithiocarbamates, and thiazoles. Preferable organic sulfur compounds are thiophenols, polysulfides having 2 to 4 sulfur atoms, thionaphthols, thiurams, and metal salts thereof.

Specific examples of the organic sulfur compound (f) are represented by the following chemical formulas (1) to (4).

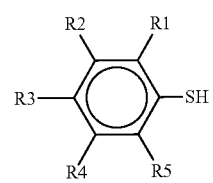

(1)

In the chemical formula (1), R1 to R5 each represent H or a substituent.

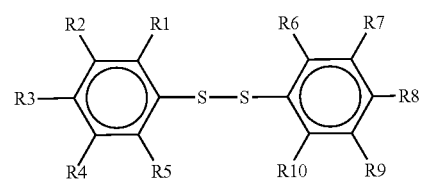

(2)

In the chemical formula (2), R1 to R10 each represent H or a substituent.

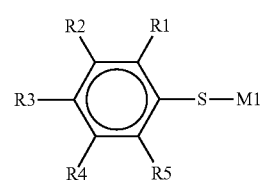

(3)

In the chemical formula (3), R1 to R5 each represent H or a substituent, and M1 represents a monovalent metal atom.

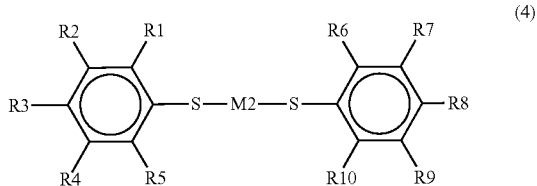

(4)

In the chemical formula (4), R1 to R10 each represent H or a substituent, and M2 represents a bivalent metal atom.

In the chemical formulas (1) to (4), each substituent is at least one group selected from the group consisting of a halogen group (F, Cl, Br, I), an alkyl group, a carboxyl group (—COOH), an ester (—COOR) of a carboxyl group, a formyl group (—CHO), an acyl group (—COR), a carbonyl halide group (—COX), a sulfo group (—SO$_3$H), an ester (—SO$_3$R) of a sulfo group, a sulfonyl halide group (—SO$_2$X), a sulfino group (—SO$_2$H), an alkylsulfinyl group (—SOR), a carbamoyl group (—CONH$_2$), an alkyl halide group, a cyano group (—CN), and an alkoxy group (—OR).

Examples of the organic sulfur compound represented by the chemical formula (1) include thiophenol; thiophenols substituted with halogen groups, such as 4-fluorothiophenol, 2,5-difluorothiophenol, 2,4,5-trifluorothiophenol, 2,4,5,6-tetrafluorothiophenol, pentafluorothiophenol, 2-chlorothiophenol, 4-chlorothiophenol, 2,4-dichlorothiophenol, 2,5-dichlorothiophenol, 2,4,5-trichlorothiophenol, 2,4,5,6-tetrachlorothiophenol, pentachlorothiophenol, 4-bromothiophenol, 2,5-dibromothiophenol, 2,4,5-tribromothiophenol, 2,4,5,6-tetrabromothiophenol, pentabromothiophenol, 4-iodothiophenol, 2,5-diiodothiophenol, 2,4,5-triiodothiophenol, 2,4,5,6-tetraiodothiophenol, and pentaiodothiophenol; thiophenols substituted with alkyl groups, such as 4-methylthiophenol, 2,4,5-trimethylthiophenol, pentamethylthiophenol, 4-t-butylthiophenol, 2,4,5-tri-t-butylthiophenol, and penta-t-butylthiophenol; thiophenols substituted with carboxyl groups, such as 4-carboxythiophenol, 2,4,6-tricarboxythiophenol, and pentacarboxythiophenol; thiophenols substituted with alkoxycarbonyl groups, such as 4-methoxycarbonylthiophenol, 2,4,6-trimethoxycarbonylthiophenol, and pentamethoxycarbonylthiophenol; thiophenols substituted with formyl groups, such as 4-formylthiophenol, 2,4,6-triformylthiophenol, and pentaformylthiophenol; thiophenols substituted with acyl groups, such as 4-acetylthiophenol, 2,4,6-triacetylthiophenol, and pentaacetylthiophenol; thiophenols substituted with carbonyl halide groups, such as 4-chlorocarbonylthiophenol, 2,4,6-tri(chlorocarbonyl)thiophenol, and penta(chlorocarbonyl)thiophenol; thiophenols substituted with sulfo groups, such as 4-sulfothiophenol, 2,4,6-trisulfothiophenol, and pentasulfothiophenol; thiophenols substituted with alkoxysulfonyl groups, such as 4-methoxysulfonylthiophenol, 2,4,6-trimethoxysulfonylthiophenol, and pentamethoxysulfonyithiophenol; thiophenols substituted with sulfonyl halide groups, such as 4-chlorosulfonylthiophenol, 2,4,6-tri(chlorosulfonyl)thiophenol, and penta(chlorosulfonyl)thiophenol; thiophenolssubstitutedwith sulfino groups, such as 4-sulfinothiophenol, 2,4,6-trisulfinothiophenol, and pentasulfinothiophenol; thiophenols substituted with alkylsulfinyl groups, such as 4-methylsulfinylthiophenol, 2,4,6-tri(methylsulfinyl)thiophenol, and penta(methylsulfinyl)thiophenol; thiophenolssubstitutedwith carbamoyl groups, such as 4-carbamoylthiophenol, 2,4,6-tricarbamoylthiophenol, and pentacarbamoylthiophenol; thiophenols substituted with alkyl halide groups, such as 4-trichloromethylthiophenol, 2,4,6-tri(trichloromethyl) thiophenol, and penta(trichloromethyl)thiophenol; thiophenols substituted with cyano groups, such as 4-cyanothiophenol, 2,4,6-tricyanothiophenol, and pentacyanothiophenol; and thiophenols substituted with alkoxy groups, such as 4-methoxythiophenol, 2,4,6-trimethoxythiophenol, and pentamethoxythiophenol. Each of these thiophenols is substituted with one type of substituent.

Another example of the organic sulfur compound represented by the chemical formula (1) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include 4-chloro-2-nitrothiophenol, 4-chloro-2-aminothiophenol, 4-chloro-2-hydroxythiophenol, 4-chloro-2-phenylthiothiophenol, 4-methyl-2-nitrothiophenol, 4-methyl-2-aminothiophenol, 4-methyl-2-hydroxythiophenol, 4-methyl-2-phenylthiothiophenol, 4-carboxy-2-nitrothiophenol, 4-carboxy-2-aminothiophenol, 4-carboxy-2-hydroxythiophenol, 4-carboxy-2-phenylthiothiophenol, 4-methoxycarbonyl-2-nitrothiophenol, 4-methoxycarbonyl-2-aminothiophenol, 4-methoxycarbonyl-2-hydroxythiophenol, 4-methoxycarbonyl-2-phenylthiothiophenol, 4-formyl-2-nitrothiophenol, 4-formyl-2-aminothiophenol, 4-formyl-2-hydroxythiophenol, 4-formyl-2-phenylthiothiophenol, 4-acetyl-2-nitrothiophenol, 4-acetyl-2-aminothiophenol, 4-acetyl-2-hydroxythiophenol, 4-acetyl-2-phenylthiothiophenol, 4-chlorocarbonyl-2-nitrothiophenol, 4-chlorocarbonyl-2-aminothiophenol, 4-chlorocarbonyl-2-hydroxythiophenol, 4-chlorocarbonyl-2-phenylthiothiophenol, 4-sulfo-2-nitrothiophenol, 4-sulfo-2-aminothiophenol, 4-sulfo-2-hydroxythiophenol, 4-sulfo-2-phenylthiothiophenol, 4-methoxysulfonyl-2-nitrothiophenol, 4-methoxysulfonyl-2-aminothiophenol, 4-methoxysulfonyl-2-hydroxythiophenol, 4-methoxysulfonyl-2-phenylthiothiophenol, 4-chlorosulfonyl-2-nitrothiophenol, 4-chlorosulfonyl-2-aminothiophenol, 4-chlorosulfonyl-2-hydroxythiophenol, 4-chlorosulfonyl-2-phenylthiothiophenol, 4-sulfino-2-nitrothiophenol, 4-sulfino-2-aminothiophenol, 4-sulfino-2-hydroxythiophenol, 4-sulfino-2-phenylthiothiophenol, 4-methylsulfinyl-2-nitrothiophenol, 4-methyl-2-aminosulfinylthiophenol, 4-methylsulfinyl-2-hydroxythiophenol, 4-methylsulfinyl-2-phenylthiothiophenol, 4-carbamoyl-2-nitrothiophenol, 4-carbamoyl-2-aminothiophenol, 4-carbamoyl-2-hydroxythiophenol, 4-carbamoyl-2-phenylthiothiophenol, 4-trichloromethyl-2-nitrothiophenol, 4-trichloromethyl-2-aminothiophenol, 4-trichloromethyl-2-hydroxythiophenol, 4-trichloromethyl-2-phenylthiothiophenol, 4-cyano-2-nitrothiophenol, 4-cyano-2-aminothiophenol, 4-cyano-2-hydroxythiophenol, 4-cyano-2-phenylthiothiophenol, 4-methoxy-2-nitrothiophenol, 4-methoxy-2-aminothiophenol, 4-methoxy-2-hydroxythiophenol, and 4-methoxy-2-phenylthiothiophenol.

Still another example of the organic sulfur compound represented by the chemical formula (1) is a compound substituted with two or more types of substituents. Specific examples of the compound include 4-acetyl-2-chlorothiophenol, 4-acetyl-2-methylthiophenol, 4-acetyl-2-carboxythiophenol, 4-acetyl-2-methoxycarbonylthiophenol, 4-acetyl-2-formylthiophenol, 4-acetyl-2-chlorocarbonylthiophenol, 4-acetyl-2-sulfothiophenol, 4-acetyl-2-methoxysulfonylthiophenol, 4-acetyl-2-chlorosulfonylthiophenol, 4-acetyl-2-sulfinothiophenol, 4-acetyl-2-methylsulfinylthiophenol, 4-acetyl-2-carbamoylthiophenol, 4-acetyl-2- trichloromethylthiophenol, 4-acetyl-2-cyanothiophenol, and 4-acetyl-2-methoxythiophenol.

Examples of the organic sulfur compound represented by the chemical formula (2) include diphenyl disulfide; diphenyl disulfides substituted with halogen groups, such as bis(4-fluorophenyl)disulfide, bis(2,5-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,4,5-triiodophenyl)disulfide, bis(2,4,5,6-tetraiodophenyl)disulfide, and bis(pentaiodophenyl)disulfide; diphenyl disulfides substituted with alkyl groups, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; diphenyl disulfides substituted with carboxyl groups, such as bis(4-carboxyphenyl)disulfide, bis(2,4,6-tricarboxyphenyl)disulfide, and bis(pentacarboxyphenyl)disulfide; diphenyl disulfides substituted with alkoxycarbonyl groups, such as bis(4-methoxycarbonylphenyl)disulfide, bis(2,4,6-trimethoxycarbonylphenyl)disulfide, and bis(pentamethoxycarbonylphenyl)disulfide; diphenyl disulfides substituted with formyl groups, such as bis(4-formylphenyl)disulfide, bis(2,4,6-triformylphenyl)disulfide, and bis(pentaformylphenyl)disulfide; diphenyl disulfides substituted with acyl groups, such as bis(4-acetylphenyl)disulfide, bis(2,4,6-triacetylphenyl)disulfide, and bis(pentaacetylphenyl)disulfide; diphenyl disulfides substituted with carbonyl halide groups, such as bis(4-chlorocarbonylphenyl)disulfide, bis(2,4,6-tri(chlorocarbonyl)phenyl)disulfide, and bis(penta(chlorocarbonyl)phenyl)disulfide; diphenyl disulfides substituted with sulfo groups, such as bis(4-sulfophenyl)disulfide, bis(2,4,6-trisulfophenyl)disulfide, and bis(pentasulfophenyl)disulfide; diphenyl disulfides substituted with alkoxysulfonyl groups, such as bis(4-methoxysulfonylphenyl)disulfide, bis(2,4,6-trimethoxysulfonylphenyl)disulfide, and bis(pentamethoxysulfonylphenyl)disulfide; diphenyl disulfides substituted with sulfonyl halide groups, such as bis(4-chlorosulfonylphenyl)disulfide, bis(2,4,6-tri(chlorosulfonyl)phenyl)disulfide, and bis(penta(chlorosulfonyl)phenyl)disulfide; diphenyl disulfides substituted with sulfino groups, such as bis(4-sulfinophenyl)disulfide, bis(2,4,6-trisulfinophenyl)disulfide, and bis(pentasulfinophenyl)disulfide; diphenyl disulfides substituted with alkylsulfinyl groups, such as bis(4-methylsulfinylphenyl)disulfide, bis(2,4,6-tri(methylsulfinyl)phenyl)disulfide, and bis(penta(methylsulfinyl)phenyl)disulfide; diphenyl disulfides substituted with carbamoyl groups, such as bis(4-carbamoylphenyl)disulfide, bis(2,4,6-tricarbamoylphenyl)disulfide, and bis(pentacarbamoylphenyl)disulfide; diphenyl disulfides substituted with alkyl halide groups, such as bis(4-trichloromethylphenyl)disulfide, bis(2,4,6-tri(trichloromethyl)phenyl)disulfide, and bis(penta(trichloromethyl)phenyl)disulfide; diphenyl disulfides substituted with cyano groups, such as bis(4-cyanophenyl)disulfide, bis(2,4,6-tricyanophenyl)disulfide, and bis(pentacyanophenyl)disulfide; and diphenyl disulfides substituted with alkoxy groups, such as bis(4-methoxyphenyl)disulfide, bis(2,4,6-trimethoxyphenyl)disulfide, and bis(pentamethoxyphenyl)disulfide. Each of these diphenyl disulfides is substituted with one type of substituent.

Another example of the organic sulfur compound represented by the chemical formula (2) is a compound substituted with at least one type of the above substituents and another substituent. Examples of the other substituent include a nitro group ($—NO_2$), an amino group ($—NH_2$), a hydroxyl group (—OH), and a phenylthio group (—SPh). Specific examples of the compound include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4-methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, and bis(4-methoxy-2-phenylthiophenyl)disulfide.

Still another example of the organic sulfur compound represented by the chemical formula (2) is a compound substituted with two or more types of substituents. Specific examples of the compound include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis (4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, and bis(4-acetyl-2-methoxyphenyl) disulfide.

Examples of the organic sulfur compound represented by the chemical formula (3) include thiophenol sodium salt; thiophenol sodium salts substituted with halogen groups, such as 4-fluorothiophenol sodium salt, 2,5-difluorothiophenol sodium salt, 2,4,5-trifluorothiophenol sodium salt, 2,4,5,6-tetrafluorothiophenol sodium salt, pentafluorothiophenol sodium salt, 4-chlorothiophenol sodium salt, 2,5-dichlorothiophenol sodium salt, 2,4,5-trichlorothiophenol sodium salt, 2,4,5,6-tetrachlorothiophenol sodium salt, pentachlorothiophenol sodium salt, 4-bromothiophenol sodium salt, 2,5-dibromothiophenol sodium salt, 2,4,5-tribromothiophenol sodium salt, 2,4,5,6-tetrabromothiophenol sodium salt, pentabromothiophenol sodium salt, 4-iodothiophenol sodium salt, 2,5-diiodothiophenol sodium salt, 2,4,5-triiodothiophenol sodium salt, 2,4,5,6-tetraiodothiophenol sodium salt, and pentaiodothiophenol sodium salt; thiophenol sodium salts substituted with alkyl groups, such as 4-methylthiophenol sodium salt, 2,4,5-trimethylthiophenol sodium salt, pentamethylthiophenol sodium salt, 4-t-butylthiophenol sodium salt, 2,4,5-tri-t-butylthiophenol sodium salt, and penta(t-butyl)thiophenol sodium salt; thiophenol sodium salts substituted with carboxyl groups, such as 4-carboxythiophenol sodium salt, 2,4,6-tricarboxythiophenol sodium salt, and pentacarboxythiophenol sodium salt; thiophenol sodium salts substituted with alkoxycarbonyl groups, such as 4-methoxycarbonylthiophenol sodium salt, 2,4,6-trimethoxycarbonylthiophenol sodium salt, and pentamethoxycarbonylthiophenol sodium salt; thiophenol sodium salts substituted with formyl groups, such as 4-formylthiophenol sodium salt, 2,4,6-triformylthiophenol sodium salt, and pentaformylthiophenol sodium salt; thiophenol sodium salts substituted with acyl groups, such as 4-acetylthiophenol sodium salt, 2,4,6-triacetylthiophenol sodium salt, and pentaacetylthiophenol sodium salt; thiophenol sodium salts substituted with carbonyl halide groups, such as 4-chlorocarbonylthiophenol sodium salt, 2,4,6-tri(chlorocarbonyl)thiophenol sodium salt, and penta(chlorocarbonyl)thiophenol sodium salt; thiophenol sodium salts substituted with sulfo groups, such as 4-sulfothiophenol sodium salt, 2,4,6-trisulfothiophenol sodium salt, and pentasulfothiophenol sodium salt; thiophenol sodium salts substituted with alkoxysulfonyl groups, such as 4-methoxysulfonylthiophenol sodium salt, 2,4,6-trimethoxysulfonylthiophenol sodium salt, and pentamethoxysulfonylthiophenol sodium salt; thiophenol sodium salts substituted with sulfonyl halide groups, such as 4-chlorosulfonylthiophenol sodium salt, 2,4,6-tri(chlorosulfonyl)thiophenol sodium salt, and penta(chlorosulfonyl)thiophenol sodium salt; thiophenol sodium salts substituted with sulfino groups, such as 4-sulfinothiophenol sodium salt, 2,4,6-trisulfinothiophenol sodium salt, and pentasulfinothiophenol sodium salt; thiophenol sodium salts substituted with alkylsulfinyl groups, such as 4-methylsulfinylthiophenol sodium salt, 2,4,6-tri(methylsulfinyl)thiophenol sodium salt, and penta(methylsulfinyl)thiophenol sodium salt; thiophenol sodium salts substituted with carbamoyl groups, such as 4-carbamoylthiophenol sodium salt, 2,4,6-tricarbamoylthiophenol sodium salt, and pentacarbamoylthiophenol sodium salt; thiophenol sodium salts substituted with alkyl halide groups, such as 4-trichloromethylthiophenol sodium salt, 2,4,6-tri(trichloromethyl)thiophenol sodium salt, and penta(trichloromethyl)thiophenol sodium salt; thiophenol sodium salts substituted with cyano groups, such as 4-cyanothiophenol sodium salt, 2,4,6-tricyanothiophenol sodium salt, and pentacyanothiophenol sodium salt; and thiophenol sodium salts substituted with alkoxy groups, such as 4-methoxythiophenol sodium salt, 2,4,6-trimethoxythiophenol sodium salt, and pentamethoxythiophenol sodium salt. Each of these thiophenol sodium salts is substituted with one type of substituent.

Another example of the organic sulfur compound represented by the chemical formula (3) is a compound substituted with at least one type of the above substituents and another substituent. Examples of the other substituent include a nitro group ($-NO_2$) an amino group ($-NH_2$), a hydroxyl group ($-OH$), and a phenylthio group ($-SPh$). Specific examples of the compound include 4-chloro-2-nitrothiophenol sodium salt, 4-chloro-2-aminothiophenol sodium salt, 4-chloro-2-hydroxythiophenol sodium salt, 4-chloro-2-phenylthiothiophenol sodium salt, 4-methyl-2-nitrothiophenol sodium salt, 4-methyl-2-aminothiophenol sodium salt, 4-methyl-2-hydroxythiophenol sodium salt, 4-methyl-2-phenylthiothiophenol sodium salt, 4-carboxy-2-nitrothiophenol sodium salt, 4-carboxy-2-aminothiophenol sodium salt, 4-carboxy-2-hydroxythiophenol sodium salt, 4-carboxy-2-phenylthiothiophenol sodium salt, 4-methoxycarbonyl-2-nitrothiophenol sodium salt, 4-methoxycarbonyl-2-aminothiophenol sodium salt, 4-methoxycarbonyl-2-hydroxythiophenol sodium salt, 4-methoxycarbonyl-2-phenylthiothiophenol sodium salt, 4-formyl-2-nitrothiophenol sodium salt, 4-formyl-2-aminothiophenol sodium salt, 4-formyl-2-hydroxythiophenol sodium salt, 4-formyl-2-phenylthiothiophenol sodium salt, 4-acetyl-2-nitrothiophenol sodium salt, 4-acetyl-2-aminothiophenol sodium salt, 4-acetyl-2-hydroxythiophenol sodium salt, 4-acetyl-2-phenylthiothiophenol sodium salt, 4-chlorocarbonyl-2-nitrothiophenol sodium salt, 4-chlorocarbonyl-2-aminothiophenol sodium salt, 4-chlorocarbonyl-2-hydroxythiophenol sodium salt, 4-chlorocarbonyl-2-phenylthiothiophenol sodium salt, 4-sulfo-2-nitrothiophenol sodium salt, 4-sulfo-2-aminothiophenol sodium salt, 4-sulfo-2-hydroxythiophenol sodium salt, 4-sulfo-2-phenylthiothiophenol sodium salt, 4-methoxysulfonyl-2-nitrothiophenol sodium salt, 4-methoxysulfonyl-2-aminothiophenol sodium salt, 4-methoxysulfonyl-2-hydroxythiophenol sodium salt, 4-methoxysulfonyl-2-phenylthiothiophenol sodium salt, 4-chlorosulfonyl-2-nitrothiophenol sodium salt, 4-chlorosulfonyl-2-aminothiophenol sodium salt, 4-chlorosulfonyl-2-hydroxythiophenol sodium salt, 4-chlorosulfonyl-2-phenylthiothiophenol sodium salt, 4-sulfino-2-nitrothiophenol sodium salt, 4-sulfino-2-aminothiophenol sodium salt, 4-sulfino-2-hydroxythiophenol sodium salt, 4-sulfino-2-phenylthiothiophenol sodium salt, 4-methylsulfinyl-2-nitrothiophenol sodium salt, 4-methylsulfinyl-2-aminothiophenol sodium salt, 4-methylsulfinyl-2-hydroxythiophenol sodium salt, 4-methylsulfinyl-2-phenylthiothiophenol sodium salt, 4-carbamoyl-2-nitrothiophenol sodium salt, 4-carbamoyl-2-aminothiophenol sodium salt, 4-carbamoyl-2-hydroxythiophenol sodium salt, 4-carbamoyl-2-phenylthiothiophenol sodium salt, 4-trichloromethyl-2-nitrothiophenol sodium salt, 4-trichloromethyl-2-aminothiophenol sodium salt, 4-trichloromethyl-2-hydroxythiophenol sodium salt, 4-trichloromethyl-2-phenylthiothiophenol sodium salt, 4-cyano-2-nitrothiophenol sodium salt, 4-cyano-2-aminothiophenol sodium salt, 4-cyano-2-hydroxythiophenol sodium salt, 4-cyano-2-phenylthiothiophenol sodium salt, 4-methoxy-2-nitrothiophenol sodium salt, 4-methoxy-2-aminothiophenol sodium salt, 4-methoxy-2-hydroxythiophenol sodium salt, and 4-methoxy-2-phenylthiothiophenol sodium salt.

Still another example of the organic sulfur compound represented by the chemical formula (3) is a compound substituted with two or more types of substituents. Specific examples of the compound include 4-acetyl-2-chlorothiophenol sodium salt, 4-acetyl-2-methylthiophenol sodium salt, 4-acetyl-2-carboxythiophenol sodium salt, 4-acetyl-2-methoxycarbonylthiophenol sodium salt, 4-acetyl-2-formylthiophenol sodium salt, 4-acetyl-2-chlorocarbonylthiophenol sodium salt, 4-acetyl-2-sulfothiophenol sodium salt, 4-acetyl-2-methoxysulfonylthiophenol sodium salt, 4-acetyl-2-chlorosulfonylthiophenol sodium salt, 4-acetyl-2-sulfinothiophenol sodium salt, 4-acetyl-2-methylsulfinylthiophenol sodium salt, 4-acetyl-2-carbamoylthiophenol sodium salt, 4-acetyl-2-trichloromethylthiophenol sodium salt, 4-acetyl-2-cyanothiophenol sodium salt, and 4-acetyl-2-methoxythiophenol sodium salt. Examples of the monovalent metal represented by M1 in the chemical formula (3) include sodium, lithium, potassium, copper (I), and silver (I).

Examples of the organic sulfur compound represented by the chemical formula (4) include thiophenol zinc salt; thiophenol zinc salts substituted with halogen groups, such as 4-fluorothiophenol zinc salt, 2,5-difluorothiophenol zinc salt, 2,4,5-trifluorothiophenol zinc salt, 2,4,5,6-tetrafluorothiophenol zinc salt, pentafluorothiophenol zinc salt, 4-chlorothiophenol zinc salt, 2,5-dichlorothiophenol zinc salt, 2,4,5-trichlorothiophenol zinc salt, 2,4,5,6-tetrachlorothiophenol zinc salt, pentachlorothiophenol zinc salt, 4-bromothiophenol zinc salt, 2,5-dibromothiophenol zinc salt, 2,4,5-tribromothiophenol zinc salt, 2,4,5,6-tetrabromothiophenol zinc salt, pentabromothiophenol zinc salt, 4-iodothiophenol zinc salt, 2,5-diiodothiophenol zinc salt, 2,4,5-triiodothiophenol zinc salt, 2,4,5,6-tetraiodothiophenol zinc salt, and pentaiodothiophenol zinc salt; thiophenol zinc salts substituted with alkyl groups, such as 4-methylthiophenol zinc salt, 2,4,5-trimethylthiophenol zinc salt, pentamethylthiophenol zinc salt, 4-t-butylthiophenol zinc salt, 2,4,5-tri-t-butylthiophenol zinc salt, and penta-t-butylthiophenol zinc salt; thiophenol zinc salts substituted with carboxyl groups, such as 4-carboxythiophenol zinc salt, 2,4,6-tricarboxythiophenol zinc salt, and pentacarboxythiophenol zinc salt; thiophenol zinc salts substituted with alkoxycarbonyl groups, such as 4-methoxycarbonylthiophenol zinc salt, 2,4,6-trimethoxycarbonylthiophenol zinc salt, and pentamethoxycarbonylthiophenol zinc salt; thiophenol zinc salts substituted with formyl groups, such as 4-formylthiophenol zinc salt, 2,4,6-triformylthiophenol zinc salt, and pentaformylthiophenol zinc salt; thiophenol zinc salts substituted with acyl groups, such as 4-acetylthiophenol zinc salt, 2,4,6-triacetylthiophenol zinc salt, and pentaacetylthiophenol zinc salt; thiophenol zinc salts substituted with carbonyl halide groups, such as 4-chlorocarbonylthiophenol zinc salt, 2,4,6-tri(chlorocarbonyl)thiophenol zinc salt, and penta(chlorocarbonyl)thiophenol zinc salt; thiophenol zinc salts substituted with sulfo groups, such as 4-sulfothiophenol zinc salt, 2,4,6-trisulfothiophenol zinc salt, and pentasulfothiophenol zinc salt; thiophenol zinc salts substituted with alkoxysulfonyl groups, such as 4-methoxysulfonylthiophenol zinc salt, 2,4,6-trimethoxysulfonylthiophenol zinc salt, and pentamethoxysulfonylthiophenol zinc salt; thiophenol zinc salts substituted with sulfonyl halide groups, such as 4-chlorosulfonylthiophenol zinc salt, 2,4,6-tri(chlorosulfonyl)thiophenol zinc salt, and penta(chlorosulfonyl)thiophenol zinc salt; thiophenol zinc salts substituted with sulfino groups, such as 4-sulfinothiophenol zinc salt, 2,4,6-trisulfinothiophenol zinc salt, and pentasulfinothiophenol zinc salt; thiophenol zinc salts substituted with alkylsulfinyl groups, such as 4-methylsulfinylthiophenol zinc salt, 2,4,6-tri(methylsulfinyl)thiophenol zinc salt, and penta(methylsulfinyl)thiophenol zinc salt; thiophenol zinc salts substituted with carbamoyl groups, such as 4-carbamoylthiophenol zinc salt, 2,4,6-tricarbamoylthiophenol zinc salt, and pentacarbamoylthiophenol zinc salt; thiophenol zinc salts substituted with alkyl halide groups, such as 4-trichloromethylthiophenol zinc salt, 2,4,6-tri(trichloromethyl)thiophenol zinc salt, and penta(trichloromethyl)thiophenol zinc salt; thiophenol zinc salts substituted with cyano groups, such as 4-cyanothiophenol zinc salt, 2,4,6-tricyanothiophenol zinc salt, and pentacyanothiophenol zinc salt; and thiophenol zinc salts substituted with alkoxy groups, such as 4-methoxythiophenol zinc salt, 2,4,6-trimethoxythiophenol zinc salt, and pentamethoxythiophenol zinc salt. Each of these thiophenol zinc salts is substituted with one type of substituent.

Another example of the organic sulfur compound represented by the chemical formula (4) is a compound substituted with at least one type of the above substituents and another substituent. Examples of the other substituent include a nitro group ($-NO_2$), an amino group ($-NH_2$), a hydroxyl group ($-OH$), and a phenylthio group ($-SPh$). Specific examples of the compound include 4-chloro-2-nitrothiophenol zinc salt, 4-chloro-2-aminothiophenol zinc salt, 4-chloro-2-hydroxythiophenol zinc salt, 4-chloro-2-phenylthiothiophenol zinc salt, 4-methyl-2-nitrothiophenol zinc salt, 4-methyl-2-aminothiophenol zinc salt, 4-methyl-2-hydroxythiophenol zinc salt, 4-methyl-2-phenylthiothiophenol zinc salt, 4-carboxy-2-nitrothiophenol zinc salt, 4-carboxy-2-aminothiophenol zinc salt, 4-carboxy-2-hydroxythiophenol zinc salt, 4-carboxy-2-phenylthiothiophenol zinc salt, 4-methoxycarbonyl-2-nitrothiophenol zinc salt, 4-methoxycarbonyl-2-aminothiophenol zinc salt, 4-methoxycarbonyl-2-hydroxythiophenol zinc salt, 4-methoxycarbonyl-2-phenylthiothiophenol zinc salt, 4-formyl-2-nitrothiophenol zinc salt, 4-formyl-2-aminothiophenol zinc salt, 4-formyl-2-hydroxythiophenol zinc salt, 4-formyl-2-phenylthiothiophenol zinc salt, 4-acetyl-2-nitrothiophenol zinc salt, 4-acetyl-2-aminothiophenol zinc salt, 4-acetyl-2-hydroxythiophenol zinc salt, 4-acetyl-2-phenylthiothiophenol zinc salt, 4-chlorocarbonyl-2-nitrothiophenol zinc salt, 4-chlorocarbonyl-2-aminothiophenol zinc salt, 4-chlorocarbonyl-2-hydroxythiophenol zinc salt, 4-chlorocarbonyl-2-phenylthiothiophenol zinc salt, 4-sulfo-2-nitrothiophenol zinc salt, 4-sulfo-2-aminothiophenol zinc salt, 4-sulfo-2-hydroxythiophenol zinc salt, 4-sulfo-2-phenylthiothiophenol zinc salt, 4-methoxysulfonyl-2-nitrothiophenol zinc salt, 4-methoxysulfonyl-2-aminothiophenol zinc salt, 4-methoxysulfonyl-2-hydroxythiophenol zinc salt, 4-methoxysulfonyl-2-phenylthiothiophenol zinc salt, 4-chlorosulfonyl-2-nitrothiophenol zinc salt, 4-chlorosulfonyl-2-aminothiophenol zinc salt, 4-chlorosulfonyl-2-hydroxythiophenol zinc salt, 4-chlorosulfonyl-2-phenylthiothiophenol zinc salt, 4-sulfino-2-nitrothiophenol zinc salt, 4-sulfino-2-aminothiophenol zinc salt, 4-sulfino-2-hydroxythiophenol zinc salt, 4-sulfino-2-phenylthiothiophenol zinc salt, 4-methylsulfinyl-2-nitrothiophenol zinc salt, 4-methylsulfinyl-2-aminothiophenol zinc salt, 4-methylsulfinyl-2-hydroxythiophenol zinc salt, 4-methylsulfinyl-2-phenylthiothiophenol zinc salt, 4-carbamoyl-2-nitrothiophenol zinc salt, 4-carbamoyl-2-aminothiophenol zinc salt, 4-carbamoyl-2-hydroxythiophenol zinc salt, 4-carbamoyl-2-phenylthiothiophenol zinc salt, 4-trichloromethyl-2-nitrothiophenol zinc salt, 4-trichloromethyl-2-aminothiophenol zinc salt, 4-trichloromethyl-2-hydroxythiophenol zinc salt, 4-trichloromethyl-2-phenylthiothiophenol zinc salt, 4-cyano-2-nitrothiophenol zinc salt, 4-cyano-2-aminothiophenol zinc salt, 4-cyano-2-hydroxythiophenol zinc salt, 4-cyano-2-phenylthiothiophenol zinc salt, 4-methoxy-2-nitrothiophenol zinc salt, 4-methoxy-2-aminothiophenol zinc salt, 4-methoxy-2-hydroxythiophenol zinc salt, and 4-methoxy-2-phenylthiothiophenol zinc salt.

Still another example of the organic sulfur compound represented by the chemical formula (4) is a compound substituted with two or more types of substituents. Specific examples of the compound include 4-acetyl-2-chlorothiophenol zinc salt, 4-acetyl-2-methylthiophenol zinc salt, 4-acetyl-2-carboxythiophenol zinc salt, 4-acetyl-2-methoxycarbonylthiophenol zinc salt, 4-acetyl-2-formylthiophenol zinc salt, 4-acetyl-2-chlorocarbonylthiophenol zinc salt, 4-acetyl-2-sulfothiophenol zinc salt, 4-acetyl-2-methoxysulfonylthiophenol zinc salt, 4-acetyl-2-chlorosulfonylthiophenol zinc salt, 4-acetyl-2-sulfinothiophenol zinc salt, 4-acetyl-2-methylsulfinylthiophenol zinc salt, 4-acetyl-2-carbamoylthiophenol zinc salt, 4-acetyl-2-trichloromethylthiophenol zinc salt, 4-acetyl-2-cyanothiophenol zinc salt, and 4-acetyl-2-methoxythiophenol zinc salt. Examples of the bivalent metal represented by M2 in the chemical formula (4) include zinc, magnesium, calcium, strontium, barium, titanium (II), manganese (II), iron (II), cobalt (II), nickel (II), zirconium (II), and tin (II).

Examples of naphthalenethiols include 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts thereof. 1-naphthalenethiol, 2-naphthalenethiol, and zinc salts thereof are preferred.

Examples of sulfenamide type organic sulfur compounds include N-cyclohexyl-2-benzothiazole sulfenamide, N-oxydiethylene-2-benzothiazole sulfenamide, and N-t-butyl-2-benzothiazole sulfenamide. Examples of thiuram type organic sulfur compounds include tetramethylthiuram monosulfide, tetramethylthiuram disulfide, tetraethylthiuram disulfide, tetrabutylthiuram disulfide, and dipentamethylenethiuram tetrasulfide. Examples of dithiocarbamates include zinc dimethyldithiocarbamate, zinc diethyldithiocarbamate, zinc dibutyldithiocarbamate, zinc ethylphenyldithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. Examples of thiazole type organic sulfur compounds include 2-mercaptobenzothiazole (MBT); dibenzothiazyl disulfide (MBTS); a sodium salt, a zinc salt, a copper salt, or a cyclohexylamine salt of 2-mercaptobenzothiazole; 2-(2,4-dinitrophenyl)mercaptobenzothiazole; and 2-(2,6-diethyl-4-morpholinothio)benzothiazole.

In light of versatility, particularly preferable organic sulfur compounds (f) are diphenyl disulfide and bis(pentabromophenyl)disulfide.

In light of resilience performance, the amount of the organic sulfur compound (f) is preferably equal to or greater than 0.05 parts by weight and particularly preferably equal to or greater than 0.1 parts by weight, per 100 parts by weight of the base rubber. In light of resilience performance, the amount is preferably equal to or less than 5.0 parts by weight and particularly preferably equal to or less than 2.0 parts by weight, per 100 parts by weight of the base rubber.

For the purpose of adjusting specific gravity and the like, a filler may be included in the core 4. Examples of suitable fillers include zinc oxide, barium sulfate, calcium carbonate, and magnesium carbonate. The amount of the filler is determined as appropriate so that the intended specific gravity of the core 4 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, a vulcanization accelerator, and the like are added to the rubber composition of the core 4. Crosslinked rubber powder or synthetic resin powder may also be dispersed in the rubber composition.

The JIS-C hardness Ho at the central point of the core 4 is preferably equal to or greater than 40 but equal to or less than 75. The golf ball 2 in which the hardness Ho is equal to or greater than 40 has excellent resilience performance. In this respect, the hardness Ho is more preferably equal to or greater than 45 and particularly preferably equal to or greater than 50. The core 4 having a hardness Ho of 75 or less can achieve an outer-hard/inner-soft structure. In the golf ball 2 that includes the core 4, a high launch angle can be achieved. In this respect, the hardness Ho is more preferably equal to or less than 70 and particularly preferably equal to or less than 65. The hardness Ho is measured by pressing a JIS-C type hardness scale against the central point of a cut plane of the core 4 that has been cut into two halves. For the measurement, an automated rubber hardness measurement machine (trade name "P1", manufactured by Kobunshi Keiki Co., Ltd.) is used.

A JIS-C hardness Hs1 at the surface of the core 4 is preferably equal to or greater than 70 but equal to or less than 85. The core 4 having a hardness Hs1 of 70 or greater can achieve an outer-hard/inner-soft structure. In the golf ball 2 that includes the core 4, a high launch angle can be achieved. In this respect, the hardness Hs1 is more preferably equal to or greater than 73 and particularly preferably equal to or greater than 76. The golf ball 2 in which the hardness Hs1 is equal to or less than 85 has excellent durability. In this respect, the hardness Hs1 is more preferably equal to or less than 82 and particularly preferably equal to or less than 80. The hardness Hs1 is measured by pressing a JIS-C type hardness scale against the surface of the core 4. For the measurement, an automated rubber hardness measurement machine (the aforementioned trade name "P1") is used.

The core 4 has a diameter of 38.2 mm or greater. The core 4 can achieve excellent resilience performance of the golf ball 2. The core 4 can achieve an outer-hard/inner-soft structure of the golf ball 2. In this respect, the diameter is particularly preferably equal to or greater than 38.4 mm. In light of durability of the golf ball 2, the diameter is preferably equal to or less than 39.5 mm.

In light of feel at impact, the core 4 has an amount of compressive deformation D1 of preferably 3.6 mm or greater. The core 4 can achieve a high launch angle. The core 4 can achieve soft feel at impact. In these respects, the amount of compressive deformation D1 is particularly preferably equal to or greater than 3.8 mm. In light of durability of the golf ball 2, the amount of compressive deformation D1 is preferably equal to or less than 4.3 mm.

The core 4 may have two or more layers. In this case, the aforementioned rubber composition is used for any one of the layers.

For the mid layer 6, a resin composition is suitably used. Examples of the base polymer of the resin composition include ionomer resins, polystyrenes, polyesters, polyamides, and polyolefins.

Particularly preferable base polymers are ionomer resins. The golf ball 2 that includes the mid layer 6 including an ionomer resin has excellent resilience performance. An ionomer resin and another resin may be used in combination for the mid layer 6. In this case, the principal component of the base polymer is preferably the ionomer resin. Specifically, the proportion of the ionomer resin to the entire base polymer is preferably equal to or greater than 50% by weight, more preferably equal to or greater than 60% by weight, and particularly preferably equal to or greater than 70% by weight.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an a-olefin, and 10% by weight or more and 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an a-olefin, 5% by weight or more and 30% by weight or less of an α,β-unsaturated carboxylic acid, and 1% by weight or more and 25% by weight or less of an α,β-unsaturated carboxylate ester. The ternary copolymer has excellent resilience performance. For the binary copolymers and the ternary copolymers, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymers and the ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E. I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation.

Two or more ionomer resins may be used in combination for the mid layer 6. An ionomer resin neutralized with a monovalent metal ion, and an ionomer resin neutralized with a bivalent metal ion may be used in combination.

A preferable resin that can be used in combination with an ionomer resin is a styrene block-containing thermoplastic elastomer. The styrene block-containing thermoplastic elastomer has excellent compatibility with ionomer resins. A resin composition including the styrene block-containing thermoplastic elastomer has excellent fluidity.

The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more members selected from the group consisting of SBS, SIS, SIBS, and hydrogenated products thereof. The olefin component in the alloy is presumed to contribute to improvement of compatibility with ionomer resins. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the mid layer 6 in an adequate amount.

From the standpoint that an outer-hard/inner-soft structure can be achieved in the sphere consisting of the core 4 and the mid layer 6, the material of the mid layer 6 has a Shore D hardness Hm of preferably 50 or greater, more preferably 55 or greater, and particularly preferably 60 or greater. In light of feel at impact of the golf ball 2, the hardness Hm is preferably equal to or less than 70 and particularly preferably equal to or less than 68. The hardness Hm is measured according to the standards of "ASTM-D 2240-68" with a Shore D type hardness scale mounted to an automated rubber hardness measurement machine (the aforementioned trade name "P1"). For the measurement, a slab that is formed by hot press and that has a thickness of about 2 mm is used. A slab kept at 23° C. for two weeks is used for the measurement. At the measurement, three slabs are stacked. A slab formed from the same resin composition as the resin composition of the mid layer 6 is used.

From the standpoint that a high launch angle can be achieved due to the outer-hard/inner-soft structure in the sphere consisting of the core 4 and the mid layer 6, the mid layer 6 has a thickness Tm of preferably 0.8 mm or greater and particularly preferably 1.0 mm or greater. In light of feel at impact and controllability, the thickness Tm is preferably equal to or less than 2.0 mm and particularly preferably equal to or less than 1.8 mm.

For forming the mid layer 6, known methods such as injection molding, compression molding, and the like can be used.

From the standpoint that an outer-hard/inner-soft structure can be achieved in the sphere consisting of the core 4 and the mid layer 6, a hardness Hs2 at the surface of the sphere is preferably equal to or greater than 50, more preferably equal to or greater than 55, and particularly preferably equal to or greater than 60. In light of feel at impact of the golf ball 2, the hardness Hs2 is preferably equal to or less than 70 and particularly preferably equal to or less than 68. The hardness Hs2 is measured by pressing a Shore D type hardness scale against the surface of the sphere. For the measurement, an automated rubber hardness measurement machine (the aforementioned trade name "P1" is used.

A resin composition is suitably used for the cover 10. Preferable base polymers of the resin composition are a polyurethane and a urea resin. The polyurethane is particularly preferred. The polyurethane is flexible. When the golf ball 2 that includes the cover 10 formed from the resin composition that includes the polyurethane is hit with a short iron, the spin rate is high. The cover 10 formed from this resin composition contributes to controllability upon a shot with a short iron. The polyurethane also contributes to the scuff resistance of the cover 10. Further, the polyurethane can contribute to excellent feel at impact when the golf ball 2 is hit with a putter or a short iron.

In light of ease of forming the cover 10, a preferable base polymer is a thermoplastic polyurethane elastomer. The thermoplastic polyurethane elastomer includes a polyurethane component as a hard segment, and a polyester component or a polyether component as a soft segment.

The polyurethane includes a polyol component. As the polyol, a polymeric polyol is preferred. Specific examples of polymeric polyols include polyether polyols such as polyoxyethylene glycol (PEG), polyoxypropylene glycol (PPG), and polytetramethylene ether glycol (PTMG); condensed polyester polyols such as polyethylene adipate (PEA), polybutylene adipate (PBA), and polyhexamethylene adipate (PHMA); lactone polyester polyols such as poly-ε-caprolactone (PCL); polycarbonate polyols such as polyhexamethylene carbonate; and acrylic polyols. Two or more polyols may be used in combination.

Particularly, polytetramethylene ether glycol is preferred. The spin rate obtained when the golf ball 2 is hit with a short iron has a high correlation with the content of polytetramethylene ether glycol. The golf ball 2 including a polyurethane that includes polytetramethylene ether glycol in an appropriate amount has excellent controllability upon a shot with a short iron.

In light of controllability, the polyol has a number average molecular weight of preferably 200 or greater, more preferably 400 or greater, and particularly preferably 650 or greater. In light of suppression of spin upon a shot with a driver, the molecular weight is preferably equal to or less than 1500 and particularly preferably equal to or less than 1400.

The number average molecular weight is measured by gel permeation chromatography. The measurement conditions are as follows.

Apparatus: HLC-8120GPC (manufactured by Tosoh Corporation)
Eluant: tetrahydrofuran
Concentration: 0.2% by weight
Temperature: 40° C.
Column: TSK gel Super HM-M (manufactured by Tosoh Corporation)
Sample volume: 5 microliters
Flow rate: 0.5 milliliter/min
Reference material: polystyrene ("PStQuick Kit-H" manufactured by Tosoh Corporation)

The polymeric polyol component has a hydroxyl value of preferably 94 mg KOH/g or greater and particularly preferably 112 mg KOH/g or greater. The hydroxyl value is preferably equal to or less than 561 mg KOH/g and particularly preferably equal to or less than 173 mg KOH/g.

Examples of an isocyanate component in the polyurethane include aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic polyisocyanates such as 4,4'-dicyclohexylmethane diisocyanate ($H_{12}MDI$), hydrogenated xylylene diisocyanate ($H_6XDI$), and isophorone diisocyanate (IPDI); and aliphatic polyisocyanates such as hexamethylene diisocyanate (HDI). Two or more polyisocyanates may be used in combination. In light of weather resistance, TMXDI, XDI, HDI, $H_6XDI$, IPDI, and $H_{12}MDI$ are preferred, and $H_{12}MDI$ is particularly preferred.

The polyurethane may include a chain extender as its component. Examples of chain extenders include low-molecular-weight polyols and low-molecular-weight polyamines.

Examples of low-molecular-weight polyols include diols, triols, tetraols, and hexaols. Specific examples of diols include ethylene glycol, diethylene glycol, propanediol, dipropylene glycol, butanediol, neopentyl glycol, pentanediol, hexanediol, heptanediol, and octanediol. Specific examples of triols include glycerin, trimethylolpropane, and hexanetriol. Specific examples of tetraols include pentaerythritol and sorbitol. 1,4-butanediol is preferred.

Examples of low-molecular-weight polyamines include aliphatic polyamines, monocyclic aromatic polyamines, and polycyclic aromatic polyamines. Specific examples of aliphatic polyamines include ethylenediamine, propylenediamine, butylenediamine, and hexamethylenediamine. Specific examples of monocyclic aromatic polyamines include phenylenediamine, toluene diamine, dimethyl toluene diamine, dimethylthio toluene diamine, and xylylenediamine.

The chain extender has a number average molecular weight of preferably 30 or greater, more preferably 40 or greater, and particularly preferably 45 or greater. The molecular weight is preferably equal to or less than 400, more preferably equal to or less than 350, and particularly preferably equal to or less than 200. Low-molecular-weight polyols and low-molecularweight polyamines that are used as chain extenders are low-molecular-weight compounds that have almost no molecular weight distribution. Thus, the low-molecular-weight polyols and the low-molecular-weight polyamines can be distinguished from the polymeric polyol.

The cover 10 may be formed from a composition including a polyurethane and an isocyanate compound. During or after forming the cover 10, the polyurethane is crosslinked with the isocyanate compound.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 10 in an adequate amount.

Specific examples of thermoplastic polyurethane elastomers include trade names "Elastollan NY78A", "Elastollan NY80A", "Elastollan NY82A", "Elastollan NY84A", "Elastollan NY85A", "Elastollan NY88A", "Elastollan NY90A", "Elastollan NY97A", "Elastollan NY585", and "Elastollan XKP016N", manufactured by BASF Japan Ltd.; and trade names "RESAMINE P4585LS" and "RESAMINE PS62490", manufactured by Dainichiseika Color & Chemicals Mfg. Co., Ltd. From the standpoint that a low hardness of the cover 10 can be achieved, "Elastollan NY80A", "Elastollan NY82A", "Elastollan NY84A", "Elastollan NY85A", and "Elastollan NY90A" are particularly preferred.

A thermoplastic polyurethane elastomer and another resin may be used in combination. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base polymer, in light of spin performance and scuff resistance. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the cover 10 in an adequate amount.

The material of the cover 10 has a Shore D hardness Hc of preferably 37 or less. The golf ball 2 that includes the cover 10 having a hardness Hc of 37 or less has excellent controllability. In this respect, the hardness Hc is more preferably equal to or less than 35 and particularly preferably equal to or less than 32. In light of flight distance upon a shot with a driver, the hardness Hc is preferably equal to or greater than 10, more preferably equal to or greater than 15, and particularly preferably equal to or greater than 20. The hardness Hc is measured by the same measurement method as that for the hardness Hm.

The hardness Hc of the material of the cover 10 is less than the hardness Hm of the mid layer 6. The difference (Hm−Hc) between both hardnesses is greater than 28. In the golf ball 2 in which the difference (Hm−Hc) is greater than 28, both a high launch angle when being hit by a powerless golf player with a driver and a high spin rate when being hit with a short iron are achieved. In this respect, the difference (Hm−Hc) is more preferably equal to or greater than 32 and particularly preferably equal to or greater than 34. The difference (Hm−Hc) is preferably equal to or less than 40.

A shore D hardness Hs3 at the surface of the golf ball 2 is preferably equal to or greater than 55 and particularly preferably equal to or greater than 60. The hardness Hs3 is preferably equal to or less than 70. The hardness Hs3 is measured by pressing a Shore D type hardness scale against the surface of the golf ball 2. For the measurement, an automated rubber hardness measurement machine (the aforementioned trade name "P1") is used.

The hardness Hs3 is less than the Shore D hardness Hs2 at the surface of the sphere consigning of the core 4 and the mid layer 6. The difference (Hs2−Hs3) between both hardnesses is less than 5. When the golf ball 2 in which the difference (Hm−Hc) is greater than 28 and the difference (Hs2−Hs3) is less than 5 is hit with a driver, the sphere consisting of the core 4 and the mid layer 6 becomes significantly distorted. Since this sphere has an outer-hard/inner-soft structure, a high launch angle is achieved. Due to the high launch angle, a large flight distance is obtained. When the golf ball 2 is hit with a short iron, this sphere becomes less distorted. When the golf ball 2 is hit with a short iron, the behavior of the golf ball 2 mainly depends on the cover 10. The cover 10 suppresses a slip between the golf ball 2 and a clubface. Due to the suppression of the slip, a high spin rate is obtained. The high spin rate achieves excellent controllability. In the golf ball 2, both desired flight performance upon a shot with a driver and desired controllability upon a shot with a short iron are achieved. In this respect, the difference (Hs2−Hs3) is more preferably equal to or less than 4 and particularly preferably equal to or less than 3. The difference (Hs2−Hs3) is preferably equal to or greater than 1.

In light of achievement of both desired flight performance upon a shot with driver and desired controllability upon a shot with a short iron, the ratio (Hs2−Hs3)/(Hm−Hc) is preferably equal to or less than 0.10 and particularly preferably equal to or less than 0.06.

From the standpoint that a high launch angle can be achieved upon hitting with a driver, the cover 10 has a thickness Tc of preferably 0.8 mm or less, more preferably 0.6 mm or less, and particularly preferably 0.5 mm or less. In light of controllability upon a shot with a short iron, the thickness Tc is preferably equal to or greater than 0.10 mm and particularly preferably equal to or greater than 0.15 mm.

The thickness Tm of the mid layer 6 is larger than the thickness Tc of the cover 10. The ratio (Tm/Tc) of both thicknesses is greater than 3.0 and less than 5.0. When the golf ball 2 in which the ratio (Tm/Tc) is greater than 3.0 is hit with a driver, a high launch angle can be achieved. When the golf ball 2 in which the ratio (Tm/Tc) is less than 5.0 is hit with a short iron, a high spin rate is achieved. In addition, in the golf ball 2 in which the ratio (Tm/Tc) is less than 5.0, soft feel at impact is achieved. In these respects, the ratio (Tm/Tc) is particularly preferably equal to or less than 4.0.

For forming the cover 10, known methods such as injection molding, compression molding, and the like can be used. When forming the cover 10, the dimples 12 are formed by pimples formed on the cavity face of a mold.

If the cover 10 is laminated directly on the mid layer 6, the cover 10 does not firmly adhere to the mid layer 6 due to the difference between the base resin of the cover 10 and the base resin of the mid layer 6. In the golf ball 2 according to the present invention, the reinforcing layer 8 is present between the mid layer 6 and the cover 10. The reinforcing layer 8 firmly adheres to the mid layer 6 and also to the cover 10. The reinforcing layer 8 enhances the adhesion between the mid layer 6 and the cover 10. The golf ball 2 is unlikely to break even by being repeatedly hit. Even when the golf ball 2 is hit with a short iron, a scuff and a wrinkle are unlikely to occur in the cover 10. In the golf ball 2, loss of energy transfer is small when the golf ball 2 is hit with a golf club. The golf ball 2 has excellent resilience performance.

The reinforcing layer 8 is formed by applying an adhesive to the surface of the mid layer 6 and drying the adhesive. As the base polymer of the adhesive, a two-component curing type thermosetting resin is suitably used. Specific examples of the two-component curing type thermosetting resin include epoxy resins, urethane resins, acrylic resins, polyester resins, and cellulose resins. In light of strength and durability of the reinforcing layer 8, two-component curing type epoxy resins are preferred.

A preferable two-component curing type epoxy resin is obtained by curing a bisphenol A type epoxy resin with a curing agent including a polyamine compound. The bisphenol A type epoxy resin is used for the two-component curing type epoxy resin, and thus the two-component curing type epoxy resin has excellent flexibility, chemical resistance, heat resistance, and toughness.

The adhesive is obtained by mixing a base material including a bisphenol A type epoxy resin and a solvent with a curing agent including a polyamine compound and a solvent. Examples of the solvents in the base material and the curing agent include organic solvents such as xylene and toluene and water.

Specific examples of the polyamine compound include polyamide amines and modified products thereof. A polyamide amine has a plurality of amino groups and one or more amide groups. The amino groups can react with epoxy groups. A polyamide amine is obtained by a condensation reaction of a polymerized fatty acid and a polyamine. A typical polymerized fatty acid is obtained by heating and combining natural fatty acids including a large amount of unsaturated fatty acids, such as linoleic acid, linolenic acid, and the like, in the presence of a catalyst. Specific examples of unsaturated fatty acids include tall oil, soybean oil, linseed oil, and fish oil. A hydrogenated polymerized fatty acid having a dimer content of 90% by weight or greater and a trimer content of 10% by weight or less is preferred. Examples of preferable polyamines include polyethylene diamines, polyoxyalkylene diamines, and derivatives thereof.

The adhesive has a gel fraction of 40% or greater. In the reinforcing layer 8 formed from the adhesive having a gel fraction of 40% or greater, a volatile component is unlikely to remain and thus there are few bubbles included. The reinforcing layer 8 firmly adheres to the mid layer 6 and also to the cover 10. In this respect, the gel fraction is more preferably equal to or greater than 45% and particularly preferably equal to or greater than 50%.

The adhesive has a gel fraction of 80% or less. The adhesive having a gel fraction of 80% or less sufficiently reacts with the base polymer of the mid layer 6 and also with the base polymer of the cover 10. The reinforcing layer 8 firmly adheres to the mid layer 6 and also to the cover 10. In this respect, the gel fraction is more preferably equal to or less than 75% and particularly preferably equal to or less than 70%.

The reinforcing layer 8 formed from the adhesive of which the gel fraction is equal to or greater than 40% but equal to or less than 80% exerts a remarkable effect in the golf ball 2 that includes the thin cover 10. The reinforcing layer 8 formed from the adhesive of which the gel fraction is equal to or greater than 40% but equal to or less than 80% exerts a remarkable effect in the golf ball 2 that includes the flexible cover 10.

At measurement of the gel fraction, immediately after the base material and the curing agent are mixed, the adhesive is applied to a PB-137T zinc phosphate treated steel plate. The size of the steel plate is "150 mm×70 mm". The thickness of the steel plate is 0.8 mm. The steel plate is kept in the environment of 40° C. for 24 hours to form a coating film formed from the adhesive. A test piece is obtained from the steel plate and the coating film. The weight of the test piece is measured, and a weight M1 of the coating film is calculated by subtracting the weight of the steel plate from the measurement value. The test piece is immersed in acetone and allowed to stand for 24 hours. The test piece is kept in the environment of 105° C. for one hour. The test piece is cooled to 23° C. The weight of the test piece is measured, and a weight M2 of the coating film is calculated by subtracting the weight of the steel plate from the measurement value. A gel fraction G is calculated by the following mathematical formula.

$$G=(M2/M1) \cdot 100$$

The ratio of the epoxy equivalent of the bisphenol A type epoxy resin to the amine active hydrogen equivalent of the curing agent in the adhesive is preferably equal to or greater than 2.0/1.0 but equal to or less than 13.0/1.0. In the adhesive in which the ratio is equal to or greater than 2.0/1.0, the gel fraction is not too low. Therefore, the reinforcing layer 8 firmly adheres to the mid layer 6 and the cover 10. In this respect, the ratio is more preferably equal to or greater than 2.5/1.0 and particularly preferably equal to or greater than 4.0/1.0. In the adhesive in which the ratio is equal to or less than 13.0/1.0, the gel fraction is not too high. Therefore, the reinforcing layer 8 firmly adheres to the mid layer 6 and the cover 10. In this respect, the ratio is more preferably equal to or less than 12.0/1.0 and particularly preferably equal to or less than 10.0/1.0.

The amine active hydrogen equivalent of the curing agent is preferably equal to or greater than 100 g/eq but equal to or less than 800 g/eq. In the adhesive in which the equivalent is equal to or greater than 100 g/eq, the gel fraction is not too high. Therefore, the reinforcing layer 8 firmly adheres to the mid layer 6 and the cover 10. In this respect, the equivalent is more preferably equal to or greater than 200 g/eq and particularly preferably equal to or greater than 300 g/eq. In the adhesive in which the equivalent is equal to or less than 800 g/eq, the gel fraction is not too low. Therefore, the reinforcing layer 8 firmly adheres to the mid layer 6 and the cover 10. In this respect, the equivalent is more preferably equal to or less than 600 g/eq and particularly preferably equal to or less than 500 g/eq.

The adhesive includes water as a volatile component. Both water and an organic solvent are included in the concept of the volatile component. The proportion Pw of water to the entire volatile component is preferably equal to or greater than 90% by weight. In the adhesive in which the proportion Pw is equal to or greater than 90% by weight, the gel fraction is easily controlled. In this respect, the proportion Pw is more preferably equal to or greater than 95% by weight and particularly preferably equal to or greater than 99% by weight. The proportion Pw may be 100% by weight. In light of the environment, the proportion Po of the organic solvent to the entire volatile component is preferably equal to or less than 10% by weight, more preferably equal to or less than 5% by weight, and particularly preferably equal to or less than 1% by weight.

The reinforcing layer 8 may include additives such as a coloring agent (typically, titanium dioxide), an antioxidant, a light stabilizer, a fluorescent brightener, an ultraviolet absorber, an anti-blocking agent, and the like. The additives may be added to the base material or the curing agent.

As described above, the reinforcing layer 8 is obtained by applying the adhesive to the surface of the mid layer 6. The application can be conducted by a spray gun method, an electrostatic coating method, or a dipping method. In light of workability, the application by the spray gun method is preferred. After the application, the solvent is volatilized to permit a reaction of the bisphenol A type epoxy resin with the polyamine compound, thereby forming the reinforcing layer 8.

In light of durability of the golf ball 2, the reinforcing layer 8 has a thickness of preferably 0.001 mm or greater and particularly preferably 0.002 mm or greater. The thickness is preferably equal to or less than 0.1 mm. The thickness is measured by observing a cross-section of the golf ball 2 with a microscope. When the mid layer 6 has concavities and convexities on its surface from surface roughening, the thickness is measured at a convex part. The measurement is conducted so as to avoid the positions of the dimples 12.

In light of high launch angle and soft feel at impact, the golf ball 2 has an amount of compressive deformation D3 of preferably 2.9 mm or greater and particularly preferably 3.0 mm or greater. The amount of compressive deformation D3 is preferably equal to or less than 3.5 mm.

At measurement of the amount of compressive deformation, first, a sphere (the golf ball 2, the core 4, or the like) is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is measured.

EXAMPLES

The following will show the effects of the present invention by means of Examples, but the present invention should not be construed in a limited manner based on the description of these Examples.

Example 1

A rubber composition was obtained by kneading 100 parts by weight of a high-cis polybutadiene (trade name "BR-730", manufactured by JSR Corporation), 23 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.3 parts by weight of bis(pentabromophenyl)disulfide, and 0.8 parts by weight of dicumyl peroxide. This rubber composition was placed into a mold including upper and lower mold halves each having a hemispherical cavity, and heated at 170° C. for 25 minutes to obtain a core with a diameter of 38.5 mm. The amount of barium sulfate was adjusted such that the weight of a golf ball is 45.6 g.

A resin composition was obtained by kneading 55 parts by weight of an ionomer resin (the aforementioned "Surlyn 8945"), 45 parts by weight of another ionomer resin (the aforementioned "Himilan AM7329"), and 3 parts by weight of titanium dioxide with a twin-screw kneading extruder. The core was placed into a mold. The core was covered with the resin composition by injection molding to form a mid layer with a thickness of 1.6 mm.

An adhesive (a) shown in Table 4 below was prepared. The adhesive was applied to the surface of the mid layer with a spray gun, and kept at 23° C. for 12 hours to obtain a reinforcing layer with a thickness of 0.003 mm.

A resin composition was obtained by kneading 100 parts by weight of a thermoplastic polyurethane elastomer (the aforementioned "Elastollan NY82A" (1)), 0.2 parts by weight of a hindered amine light stabilizer (trade name "TINUVIN770", manufactured by Ciba Japan K.K.), 4 parts by weight of titanium dioxide, and 0.04 parts by weight of ultramarine blue with a twin-screw kneading extruder. Half shells were formed from this resin composition by compression molding. The sphere consisting of the core, the mid layer, and the reinforcing layer was covered with two of these half shells. The sphere and the half shells were placed into a final mold that includes upper and lower mold halves each having a hemispherical cavity and that has a large number of pimples on its cavity face. A cover was obtained by compression molding. The thickness of the cover was 0.5 mm. Dimples having a shape that is the inverted shape of the pimples were formed on the cover. A clear paint including a two-component curing type polyurethane as a base material was applied to this cover to obtain a golf ball of Example 1 with a diameter of 42.7 mm.

Examples 2 to 13 and Comparative Examples 1 to 6

Golf balls of Examples 2 to 13 and Comparative Examples 1 to 6 were obtained in the same manner as Example 1, except the specifications of the core, the mid layer, and the cover were as shown in Tables 6 to 9 below. The composition of the core is shown in detail in Tables 1 and 2 below. The composition of the mid layer is shown in detail in Table 3 below. The composition of the reinforcing layer is shown in detail in Table 4 below. The composition of the cover is shown in detail in Table 5 below.

[Hit with Driver (W#1)]

A driver with a titanium head (trade name "XXIO", manufactured by SRI Sports Limited, shaft hardness: R, loft angle: 13.0°) was attached to a swing machine manufactured by True Temper Co. A golf ball was hit under the condition of a head speed of 35 m/sec, and the launch angle was measured. In addition, the distance from the launch point to the stop point was measured. The average value of data obtained by 10 measurements is shown in Tables 6 to 9 below.

[Hit with Sand Wedge (SW)]

A sand wedge (SW) was attached to the above swing machine. A golf ball was hit under the condition of a head speed of 16 m/sec. The spin rate was measured immediately after the hit. The average value of data obtained by 10 measurements is shown in Tables 6 to 9 below.

[Durability]

A driver with a titanium head (trade name "XXIO", manufactured by SRI Sports Limited, shaft hardness: S, loft angle: 10.0°) was attached to the above swing machine. Meanwhile, a golf ball was kept at 23° C. for 12 hours. The golf ball was repeatedly hit under the condition of a head speed of 45 m/sec, and the number of hits required to break the golf ball was counted. The average value of data obtained by 12 measurements is shown as an index in Tables 6 to 9 below.

[Feel at Impact]

Golf players hit golf balls with drivers and categorized feel at impact on the basis of the following criteria.

A: Very soft
B: Slightly soft
C: Slightly hard
D: Very hard

The results are shown in Tables 6 to 9 below.

TABLE 1

Composition of Core (parts by weight)

|  | (1) | (2) | (3) | (4) |
|---|---|---|---|---|
| BR-730 | 100 | 100 | 100 | 100 |
| Sanceler SR | 23 | 25 | 27 | 22 |
| Zinc oxide | 5 | 5 | 5 | 5 |
| Barium sulfate | ** | ** | ** | ** |
| Bis(pentabromophenyl)disulfide | 0.3 | 0.3 | 0.3 | 0.3 |
| Dicumyl peroxide | 0.8 | 0.8 | 0.8 | 0.8 |
| Zinc stearate | — | — | — | — |
| Zinc octoate | — | — | — | — |
| Total* | 2.3 | 2.5 | 2.7 | 2.2 |

*Total amount of carboxylic acid and/or salt thereof
** Appropriate amount

TABLE 2

Composition of Core (parts by weight)

|  | (5) | (6) | (7) | (8) | (9) |
|---|---|---|---|---|---|
| BR-730 | 100 | 100 | 100 | 100 | 100 |
| Sanceler SR | 24 | 25 | 25 | 26 | 27 |
| Zinc oxide | 5 | 5 | 5 | 5 | 5 |
| Barium sulfate | ** | ** | ** | ** | ** |
| Bis(pentabromophenyl)disulfide | 0.3 | 0.3 | 0.3 | 0.3 | 0.3 |
| Dicumyl peroxide | 0.8 | 0.8 | 0.8 | 0.8 | 0.8 |
| Zinc stearate | 2.0 | 20 | 30 | 45 | — |
| Zinc octoate | — | — | — | — | 10 |
| Total* | 4.4 | 22.5 | 32.5 | 47.6 | 12.7 |

*Total amount of carboxylic acid and/or salt thereof
** Appropriate amount

The details of the compounds listed in Tables 1 and 2 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$ (100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

Zinc oxide: trade name "Ginrei R" manufactured by Toho Zinc Co., Ltd.

Barium sulfate: trade name "Barium sulfate BD" manufactured by Sakai Chemical Industry Co., Ltd.

Bis(pentabromophenyl)disulfide: a product of Kawaguchi Chemical Industry Co., LTD.

Dicumyl peroxide: a product of NOF Corporation

Zinc stearate: a product of Wako Pure Chemical Industries, Ltd.

Zinc octoate: a product of Mitsuwa Chemicals Co., Ltd.

TABLE 3

Composition of Mid Layer (parts by weight)

|  | I | II |
|---|---|---|
| Surlyn 8945 | 55 | 46 |
| Himilan AM7329 | 45 | 45 |
| Rabalon T3221C | — | 9 |
| Titanium dioxide | 3 | 3 |
| Hardness (Shore D) | 65 | 56 |

TABLE 4

Composition of Reinforcing Layer (parts by weight)

|  | a | b | c |
|---|---|---|---|
| [Base material] |  |  |  |
| Bisphenol A type epoxy resin (solvent type) | — | — | 30 |
| Bisphenol A type epoxy resin (water type) | 36 | 36 | — |
| Xylene | — | — | 35 |
| Toluene | — | — | 35 |
| Water | 64 | 64 | — |
| [Curing agent] |  |  |  |
| Modified polyamide amine (solvent type) | — | — | 40 |
| Modified polyamide amine (water type 1) | 44 | — | — |
| Modified polyamide amine (water type 2) | — | 44 | — |
| Xylene | — | — | 30 |
| Toluene | — | — | 25 |
| Water | 50 | 50 | — |
| Butyl cellosolve | 1 | 1 | — |
| Titanium dioxide | 5 | 5 | 5 |
| Base material epoxy equivalent (g/eq) | 1405 | 1405 | 1633 |
| Curing agent active hydrogen equivalent (g/eq) | 348 | 115 | 1345 |
| Organic solvent proportion Po (%) | 0.3 | 0.1 | 100 |
| Epoxy equivalent/active hydrogen equivalent | 4.0 | 12.2 | 1.2 |
| Base material/curing agent (weight ratio) | 4/1 | 12/1 | 1/1 |
| Gel fraction (%) | 64 | 45 | 88 |

TABLE 5

Composition of Cover (parts by weight)

|  | A | B | C | D | E |
|---|---|---|---|---|---|
| Elastollan NY78A | — | — | — | — | 100 |
| Elastollan NY82A (1) | 100 | — | — | — | — |
| Elastollan NY82A (2) | — | 100 | — | — | — |
| Elastollan NY85A | — | — | 50 | — | — |
| Elastollan NY90A | — | — | 50 | — | — |
| Elastollan NY97A | — | — | — | 100 | — |
| TINUVIN 770 | 0.2 | 0.2 | 0.2 | 0.2 | 0.2 |
| Titanium dioxide | 4 | 4 | 4 | 4 | 4 |
| Ultramarine blue | 0.04 | 0.04 | 0.04 | 0.04 | 0.04 |
| Hardness (Shore D) | 29 | 29 | 36 | 47 | 26 |

Each of the thermoplastic polyurethane elastomers listed in Table 5 contains polytetramethylene ether glycol as a polyol component. The number average molecular weight of the polytetramethylene ether glycol is as follows.

Elastollan NY78A: 1400

Elastollan NY82A (1): 1400

Elastollan NY82A (2): 1700

Elastollan NY85A: 1400

Elastollan NY90A: 1400

Elastollan NY97A: 1400

TABLE 6

| Results of Evaluation | | | | | |
|---|---|---|---|---|---|
| | Ex. 1 | Ex. 2 | Ex. 3 | Ex. 4 | Ex. 5 |
| [Core] | | | | | |
| Composition | (1) | (1) | (1) | (1) | (3) |
| Diameter (mm) | 38.5 | 38.5 | 38.5 | 38.5 | 38.5 |
| Hardness Ho (JIS-C) | 60.0 | 60.0 | 60.0 | 60.0 | 64.0 |
| Hardness Hs1 (JIS-C) | 76.0 | 76.0 | 76.0 | 76.0 | 80.0 |
| Hs1 − Ho | 16.0 | 16.0 | 16.0 | 16.0 | 16.0 |
| Deformation D1 (mm) | 4.0 | 4.0 | 4.0 | 4.0 | 3.5 |
| [Mid layer] | | | | | |
| Composition | I | I | I | I | I |
| Hardness Hm (Shore D) | 65 | 65 | 65 | 65 | 65 |
| Hardness Hs2 (Shore D) | 66 | 66 | 66 | 66 | 66 |
| Thickness Tm (mm) | 1.6 | 1.6 | 1.6 | 1.6 | 1.6 |
| [Reinforcing layer] | | | | | |
| Composition | a | a | b | c | a |
| [Cover] | | | | | |
| Composition | A | B | A | A | A |
| Hardness Hc (Shore D) | 29 | 29 | 29 | 29 | 29 |
| Hardness Hs3 (Shore D) | 64 | 64 | 64 | 64 | 64 |
| Thickness Tc (mm) | 0.5 | 0.5 | 0.5 | 0.5 | 0.5 |
| Tm/Tc | 3.2 | 3.2 | 3.2 | 3.2 | 3.2 |
| Hm − Hc | 36 | 36 | 36 | 36 | 36 |
| Hs2 − Hs3 | 2 | 2 | 2 | 2 | 2 |
| Deformation D3 (mm) of ball | 3.2 | 3.2 | 3.2 | 3.2 | 2.8 |
| W#1 launch angle (deg.) | 15.6 | 15.6 | 15.6 | 15.6 | 15.4 |
| W#1 flight distance (m) | 175 | 175 | 175 | 175 | 173 |
| SW spin rate (rpm) | 4800 | 4700 | 4800 | 4800 | 4900 |
| Durability | 100 | 100 | 98 | 95 | 104 |
| Feel at impact | A | A | A | A | B |

TABLE 7

| Results of Evaluation | | | | | |
|---|---|---|---|---|---|
| | Ex. 6 | Ex. 7 | Ex. 8 | Ex. 9 | Ex. 10 |
| [Core] | | | | | |
| Composition | (4) | (5) | (6) | (7) | (8) |
| Diameter (mm) | 38.5 | 38.5 | 38.5 | 38.5 | 38.5 |
| Hardness Ho (JIS-C) | 59.0 | 56.0 | 52.0 | 54.0 | 61.0 |
| Hardness Hs1 (JIS-C) | 75.0 | 78.0 | 82.0 | 81.0 | 75.0 |
| Hs1 − Ho | 16.0 | 22.0 | 30.0 | 27.0 | 14.0 |
| Deformation D1 (mm) | 4.1 | 4.1 | 4.1 | 4.1 | 4.1 |
| [Mid layer] | | | | | |
| Composition | I | I | I | I | I |
| Hardness Hm (Shore D) | 65 | 65 | 65 | 65 | 65 |
| Hardness Hs2 (Shore D) | 66 | 66 | 66 | 66 | 66 |
| Thickness Tm (mm) | 1.6 | 1.6 | 1.6 | 1.6 | 1.6 |
| [Reinforcing layer] | | | | | |
| Composition | a | a | a | a | a |
| [Cover] | | | | | |
| Composition | C | A | A | A | A |
| Hardness Hc (Shore D) | 36 | 29 | 29 | 29 | 29 |
| Hardness Hs3 (Shore D) | 65 | 64 | 64 | 64 | 64 |
| Thickness Tc (mm) | 0.5 | 0.5 | 0.5 | 0.5 | 0.5 |
| Tm/Tc | 3.2 | 3.2 | 3.2 | 3.2 | 3.2 |
| Hm − Hc | 29 | 36 | 36 | 36 | 36 |
| Hs2 − Hs3 | 1 | 2 | 2 | 2 | 2 |
| Deformation D3 (mm) of ball | 3.2 | 3.2 | 3.2 | 3.2 | 3.2 |
| W#1 launch angle (deg.) | 15.8 | 15.7 | 15.9 | 15.8 | 15.5 |
| W#1 flight distance (m) | 177 | 176 | 178 | 177 | 174 |
| SW spin rate (rpm) | 4700 | 4800 | 4750 | 4750 | 4800 |

TABLE 7-continued

| | Results of Evaluation | | | | |
|---|---|---|---|---|---|
| | Ex. 6 | Ex. 7 | Ex. 8 | Ex. 9 | Ex. 10 |
| Durability | 98 | 99 | 97 | 98 | 102 |
| Feel at impact | A | A | A | A | A |

TABLE 8

| | Results of Evaluation | | | | |
|---|---|---|---|---|---|
| | Ex. 11 | Ex. 12 | Ex. 13 | Comp. Ex. 1 | Comp. Ex. 2 |
| [Core] | | | | | |
| Composition | (9) | (1) | (1) | (1) | (2) |
| Diameter (mm) | 38.5 | 38.3 | 38.5 | 38.1 | 38.5 |
| Hardness Ho (JIS-C) | 52.0 | 60.0 | 60.0 | 60.0 | 62.0 |
| Hardness Hs1 (JIS-C) | 83.0 | 76.0 | 76.0 | 76.0 | 78.0 |
| Hs1 − Ho | 31.0 | 16.0 | 16.0 | 16.0 | 16.0 |
| Deformation D1 (mm) | 4.1 | 4.0 | 4.0 | 4.0 | 3.8 |
| [Mid layer] | | | | | |
| Composition | I | I | I | I | I |
| Hardness Hm (Shore D) | 65 | 65 | 65 | 65 | 65 |
| Hardness Hs2 (Shore D) | 66 | 66 | 66 | 66 | 65 |
| Thickness Tm (mm) | 1.6 | 1.8 | 1.6 | 1.6 | 1.1 |
| [Reinforcing layer] | | | | | |
| Composition | a | a | a | a | a |
| [Cover] | | | | | |
| Composition | A | A | E | A | A |
| Hardness Hc (Shore D) | 29 | 29 | 26 | 29 | 29 |
| Hardness Hs3 (Shore D) | 64 | 64 | 62 | 61 | 58 |
| Thickness Tc (mm) | 0.5 | 0.4 | 0.5 | 0.7 | 1.0 |
| Tm/Tc | 3.2 | 4.5 | 3.2 | 2.3 | 1.1 |
| Hm − Hc | 36 | 36 | 39 | 36 | 36 |
| Hs2 − Hs3 | 2 | 2 | 4 | 5 | 7 |
| Deformation D3 (mm) of ball | 3.2 | 3.1 | 3.2 | 3.2 | 3.2 |
| W#1 launch angle (deg.) | 16.0 | 15.7 | 15.4 | 15.3 | 15.1 |
| W#1 flight distance (m) | 179 | 176 | 173 | 168 | 165 |
| SW spin rate (rpm) | 4750 | 4700 | 4850 | 4900 | 5000 |
| Durability | 97 | 98 | 105 | 110 | 118 |
| Feel at impact | A | B | A | A | A |

TABLE 9

| | Results of Evaluation | | | | | | | | |
|---|---|---|---|---|---|---|---|---|---|
| | Comp. Ex. 3 | Comp. Ex. 4 | Comp. Ex. 5 | Comp. Ex. 6 | | Comp. Ex. 3 | Comp. Ex. 4 | Comp. Ex. 5 | Comp. Ex. 6 |
| [Core] | | | | | Hardness Hs3 (Shore D) | 55 | 65 | 65 | 61 |
| Composition | (2) | (4) | (4) | (4) | Thickness Tc (mm) | 0.5 | 0.3 | 0.5 | 0.7 |
| Diameter (mm) | 38.5 | 38.5 | 38.5 | 37.3 | Tm/Tc | 3.2 | 6.0 | 3.2 | 2.9 |
| Hardness Ho (JIS-C) | 62.0 | 59.0 | 59.0 | 59.0 | Hm − Hc | 27 | 36 | 18 | 36 |
| Hardness Hs1 (JIS-C) | 78.0 | 75.0 | 75.0 | 75.0 | Hs2 − Hs3 | 3 | 2 | 1 | 5 |
| Hs1 − Ho | 16.0 | 16.0 | 16.0 | 16.0 | Deformation D3 (mm) of ball | 3.2 | 3.2 | 3.1 | 3.1 |
| Deformation D1 (mm) | 3.8 | 4.1 | 4.1 | 4.1 | W#1 launch angle (deg.) | 15.3 | 15.8 | 15.9 | 15.4 |
| [Mid layer] | | | | | W#1 flight distance (m) | 168 | 177 | 178 | 170 |
| Composition | II | I | I | I | SW spin rate (rpm) | 4950 | 4300 | 4200 | 4850 |
| Hardness Hm (Shore D) | 56 | 65 | 65 | 65 | Durability | 107 | 94 | 92 | 100 |
| Hardness Hs2 (Shore D) | 58 | 67 | 66 | 66 | Feel at impact | A | D | C | C |
| Thickness Tm (mm) | 1.6 | 1.8 | 1.6 | 2.0 | | | | | |
| [Reinforcing layer] | | | | | | | | | |
| Composition | a | a | a | a | | | | | |
| [Cover] | | | | | | | | | |
| Composition | A | A | D | A | | | | | |
| Hardness Hc (Shore D) | 29 | 29 | 47 | 29 | | | | | |

As shown in Tables 6 to 9, the golf balls according to each Example are excellent in various performance characteristics. From the results of evaluation, advantages of the present invention are clear.

The above descriptions are merely for illustrative examples, and various modifications can be made without departing from the principles of the present invention.

What is claimed is:

1. A golf ball comprising a core, a mid layer positioned outside the core, a reinforcing layer positioned outside the mid layer, and a cover positioned outside the reinforcing layer, wherein
the mid layer material Shore D hardness Hm is greater than the cover material Shore D hardness Hc by an amount greater than 28,
the surface of a sphere including the core and the mid layer has a Shore D hardness Hs2 that is greater than the golf ball surface Shore D hardness Hs3 by an amount less than 5,
the mid layer thickness Tm is larger than the cover thickness Tc, and a ratio (Tm/Tc) of both thicknesses is greater than 3.0 and less than 5.0,
a diameter of the core is equal to or greater than 38.2 mm,
the hardness Hc is equal to or less than 37,
the reinforcing layer is formed from an adhesive, and
a gel fraction of the adhesive is equal to or greater than 40% but equal to or less than 80%.

2. The golf ball according to claim 1, wherein an amount of compressive deformation D1 of the core which is measured under conditions of an initial load of 98 N and a final load of 1274 N is equal to or greater than 3.6 mm, and an amount of compressive deformation D3 of the golf ball which is measured under the same conditions is equal to or greater than 2.9 mm.

3. The golf ball according to claim 1, wherein the hardness Hs2 is equal to or greater than 50 but equal to or less than 70.

4. The golf ball according to claim 1, wherein the hardness Hs3 is equal to or greater than 55 but equal to or less than 70.

5. The golf ball according to claim 1, wherein
the cover is formed from a resin composition,
a principal component of a base material of the resin composition is a thermoplastic polyurethane, and
a polyol component of the thermoplastic polyurethane is polytetramethylene ether glycol having a number average molecular weight of 1500 or less.

6. The golf ball according to claim 1, wherein
the core is composed of one or more layers,
any one of these layers is obtained by a rubber composition being crosslinked,
the rubber composition includes:
(a) a base rubber;
(b) a co-crosslinking agent;
(c) a crosslinking initiator; and
(d) a carboxylic acid and/or a salt thereof, and
the co-crosslinking agent (b) is:
(b1) an $\alpha,\beta$-unsaturated carboxylic acid having 3 to 8 carbon atoms; and/or
(b2) a metal salt of an $\alpha,\beta$-unsaturated carboxylic acid having 3 to 8 carbon atoms.

7. The golf ball according to claim 6, wherein the rubber composition includes 100 parts by weight of the base rubber (a) and 3 parts by weight or greater but 40 parts by weight or less of the carboxylic acid and/or the salt thereof (d).

8. The golf ball according to claim 6, wherein a carbon number of a carboxylic acid component of the carboxylic acid and/or the salt thereof (d) is equal to or greater than 4 but equal to or less than 30.

9. The golf ball according to claim 6, wherein the carboxylic acid and/or the salt thereof (d) is a fatty acid and/or a salt thereof.

10. The golf ball according to claim 6, wherein the carboxylic acid and/or the salt thereof (d) is a zinc salt of a carboxylic acid.

11. The golf ball according to claim 6, wherein the carboxylic acid and/or the salt thereof (d) is one or more members selected from the group consisting of zinc octoate, zinc laurate, zinc myristate, and zinc stearate.

* * * * *